US012699843B2

(12) United States Patent
Xu et al.

(10) Patent No.: US 12,699,843 B2
(45) Date of Patent: Aug. 4, 2026

(54) CONTENT RECOGNITION METHOD AND APPARATUS, COMPUTER DEVICE, AND STORAGE MEDIUM

(71) Applicant: Tencent Technology (Shenzhen) Company Limited, Shenzhen (CN)

(72) Inventors: Qidong Xu, Shenzhen (CN); Xiaoshuai Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 696 days.

(21) Appl. No.: 17/991,727

(22) Filed: Nov. 21, 2022

(65) Prior Publication Data

US 2023/0077849 A1 Mar. 16, 2023

Related U.S. Application Data

(63) Continuation of application No. PCT/CN2022/081896, filed on Mar. 21, 2022.

(30) Foreign Application Priority Data

Mar. 26, 2021 (CN) .......................... 202110325997.8

(51) Int. Cl.
*G06F 40/295* (2020.01)
*G06V 20/40* (2022.01)
(Continued)

(52) U.S. Cl.
CPC ............ *G06F 40/295* (2020.01); *G06V 20/46* (2022.01); *G06V 30/158* (2022.01); *G06V 30/1918* (2022.01); *G06V 20/635* (2022.01)

(58) Field of Classification Search
CPC ..... G06F 40/295; G06F 40/279; G06V 20/46; G06V 30/158; G06V 30/1918; G06V 20/635; G06N 20/00
See application file for complete search history.

(56) References Cited

U.S. PATENT DOCUMENTS

| 11,877,016 | B2 * | 1/2024 | Cui | ......................... G06V 20/40 |
| 2014/0114655 | A1 * | 4/2014 | Kalinli-Akbacak | .... G10L 15/00 |
| | | | | 704/231 |

(Continued)

FOREIGN PATENT DOCUMENTS

| CN | 109256216 | A | * | 1/2019 | ........... G06F 40/126 |
| CN | 109885723 | A | | 6/2019 | |

(Continued)

OTHER PUBLICATIONS

"Asgari-Chenaghlu, et al., A multimodal deep learning approach for named entity recognition from social media, arXiv preprint arXiv:2001.06888 (2020), pp. 1-17 " (Year: 2020).*

(Continued)

*Primary Examiner* — Ming Y Hon
*Assistant Examiner* — Dominique James
(74) *Attorney, Agent, or Firm* — ArentFox Schiff LLP

(57) ABSTRACT

A method for content recognition includes acquiring, from a content for recognition, a text piece and a media piece associated with the text piece, performing a first feature extraction on the text piece to obtain text features, performing a second feature extraction on the media piece associated with the text piece to obtain media features, and determining feature association measures between the media features and the text features. A feature association measure for a first feature in the media features and a second feature in the text features indicating an association degree between the first feature and the second feature. The method further includes adjusting the text features based on the feature association measures to obtain adjusted text features, and performing a recognition based on the adjusted text features to obtain a content recognition result of the content. Apparatus and non-transitory computer-readable storage medium counterpart embodiments are also contemplated.

20 Claims, 6 Drawing Sheets

(51) Int. Cl.

| | |
|---|---|
| *G06V 20/62* | (2022.01) |
| *G06V 30/148* | (2022.01) |
| *G06V 30/19* | (2022.01) |

(56) References Cited

U.S. PATENT DOCUMENTS

| | | | | |
|---|---|---|---|---|
| 2015/0324350 | A1 | 11/2015 | Bufe, III | |
| 2017/0293638 | A1* | 10/2017 | He | G06F 16/683 |
| 2020/0257903 | A1* | 8/2020 | Ding | G06V 10/806 |
| 2021/0142210 | A1* | 5/2021 | Cheng | G06V 10/764 |
| 2021/0335381 | A1* | 10/2021 | Park | G06N 3/09 |

FOREIGN PATENT DOCUMENTS

| | | | | | |
|---|---|---|---|---|---|
| CN | 110532866 | A | * | 12/2019 | G06F 16/784 |
| CN | 110991427 | A | | 4/2020 | |
| CN | 111680541 | A | | 9/2020 | |
| CN | 111967471 | A | * | 11/2020 | |
| CN | 112084331 | A | | 12/2020 | |
| CN | 112364810 | A | | 2/2021 | |
| CN | 112381091 | A | * | 2/2021 | G06F 18/214 |
| CN | 112418034 | A | * | 2/2021 | G06F 18/2411 |
| CN | 112507150 | A | * | 3/2021 | |
| CN | 113010740 | A | | 6/2021 | |
| CN | 113723166 | A | | 11/2021 | |
| EP | 3340639 | A1 | * | 6/2018 | G06F 3/0482 |
| WO | 2020/258661 | A1 | | 12/2020 | |

OTHER PUBLICATIONS

"Sathyanarayanan, et al., Kannada named entity recognition and classification using bidirectional long short-term memory networks, 2018 International Conference on Electrical, Electronics, Communication, Computer, and Optimization Techniques (ICEECCOT). IEEE, 2018, pp. 65-71" (Year: 2018).*

"Ho et al., Multimodal approach of speech emotion recognition using multi-level multi-head fusion attention-based recurrent neural network, IEEE Access 8 (2020): 61672-61686." (Year: 2020).*

"Al-Azani et al., Enhanced video analytics for sentiment analysis based on fusing textual, auditory and visual information, IEEE Access 8 (2020), p. 136843-136857." (Year: 2020).*

"Du et al., Employ multimodal machine learning for content quality analysis, 2020 IEEE 4th Information Technology, Networking, Electronic and Automation Control Conference (ITNEC). vol. 1, 1-4." (Year: 2020).*

"Liu et al., Visual affective classification by combining visual and text features, PloS one 12.8 (2017): e0183018, 1-21" (Year: 2017).*

"Yi et al., Affective video content analysis with adaptive fusion recurrent network, IEEE Transactions on Multimedia 22.9 (2019), pp. 2454-2466." (Year: 2019).*

International Search Report and Written Opinion in PCT/CN2022/081896, mailed May 27, 2022, 14 pages.

Office Action and Search Report received for Chinese Application No. 202110325997.8, mailed on Apr. 23, 2025, 18 pages (9 pages of original office action and 9 pages of English Translation).

* cited by examiner

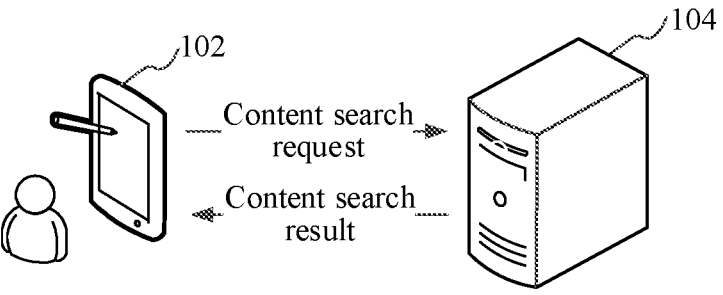

_102

_104

Content search request

Content search result

Determine target content to be recognized, and acquire, from the target content, a target text and text-associated data associated with the target text

_/ 204

Perform feature extraction on the target text to obtain text-extracted features, and perform feature extraction on the text-associated data to obtain associated extracted features

_/ 206

Determine feature association degrees between the associated extracted features and the text-extracted features, the feature association degrees being used for representing an association degree between the target text and the text-associated data

_/ 208

Adjust the text-extracted features based on the feature association degrees to obtain adjusted text features

_/ 210

Perform recognition based on the adjusted text features to obtain a content recognition result corresponding to the target content

FIG. 2

CONTENT RECOGNITION METHOD AND APPARATUS, COMPUTER DEVICE, AND STORAGE MEDIUM

RELATED APPLICATIONS

The present application is a continuation of International Application No. PCT/CN2022/081896, entitled "CONTENT IDENTIFICATION METHOD AND DEVICE, COMPUTER EQUIPMENT AND STORAGE MEDIUM" and filed on Mar. 21, 2022, which claims priority to Chinese Patent Application No. 202110325997.8, entitled "CONTENT RECOGNITION METHOD AND APPARATUS, COMPUTER DEVICE, AND STORAGE MEDIUM" and filed on Mar. 26, 2021. The entire disclosures of the prior applications are hereby incorporated by reference in their entirety.

FIELD OF THE TECHNOLOGY

This application relates to the field of computer technologies, including content recognition.

BACKGROUND OF THE DISCLOSURE

With the development of natural language processing technology and artificial intelligence technology, content recognition, such as video recognition, is required in many cases. During content recognition, content can be recognized based on an artificial intelligence model, and expected information can be acquired from the content. For example, a text can be recognized to obtain expected content entities from the text.

At present, a method for recognizing content cannot accurately recognize information of the content, resulting in low accuracy of content recognition.

SUMMARY

Various embodiments of this disclosure provide a content recognition method and apparatus, a computer device, and a non-transitory computer-readable storage medium.

Some aspects of the disclosure provide a method for content recognition. The method includes acquiring, from a content for recognition, a text piece and a media piece associated with the text piece, performing a first feature extraction on the text piece to obtain text features, performing a second feature extraction on the media piece associated with the text piece to obtain media features, and determining feature association measures between the media features and the text features. A feature association measure for a first feature in the media features and a second feature in the text features indicating an association degree between the first feature and the second feature. The method further includes adjusting the text features based on the feature association measures to obtain adjusted text features, and performing a recognition based on the adjusted text features to obtain a content recognition result of the content.

Some aspects of the disclosure provide an apparatus for content recognition, including processing circuitry. The processing circuitry is configured to acquire, from a content for recognition, a text piece and a media piece associated with the text piece. The processing circuitry is configured to perform a first feature extraction on the text piece to obtain text features. The processing circuitry is configured to perform a second feature extraction on the media piece associated with the text piece to obtain media features. The processing circuitry is configured to determine feature association measures between the media features and the text features, a feature association measure for a first feature in the media features and a second feature in the text features indicating an association degree between the first feature and the second feature. The processing circuitry is configured to adjust the text features based on the feature association measures to obtain adjusted text features. The processing circuitry is further configured to perform a recognition based on the adjusted text features to obtain a content recognition result of the content.

A computer device, including a memory and one or more processors (or processing circuitry), the memory storing computer-readable instructions, and the computer-readable instructions, when executed by the one or more processors, causing the one or more processors to perform the steps in the method for content recognition.

A non-transitory computer-readable storage medium is provided. The non-transitory computer-readable storage medium storing instructions which when executed by one or more processors cause the at least one processor to implement the steps in the method for content recognition. A computer program product, including computer-readable instructions, the computer-readable instructions, when executed by a processor, implementing the steps in the method for content recognition.

Details of one or more embodiments of this disclosure are provided in the subsequent accompanying drawings and descriptions. Other features, objectives, and advantages of this disclosure will become apparent from the specification, the accompanying drawings, and the claims.

BRIEF DESCRIPTION OF THE DRAWINGS

FIG. 1 is a diagram of an application environment of a content recognition method according to some embodiments.

FIG. 2 is a schematic flowchart of a content recognition method according to some embodiments.

DESCRIPTION OF EMBODIMENTS

Figure 3:
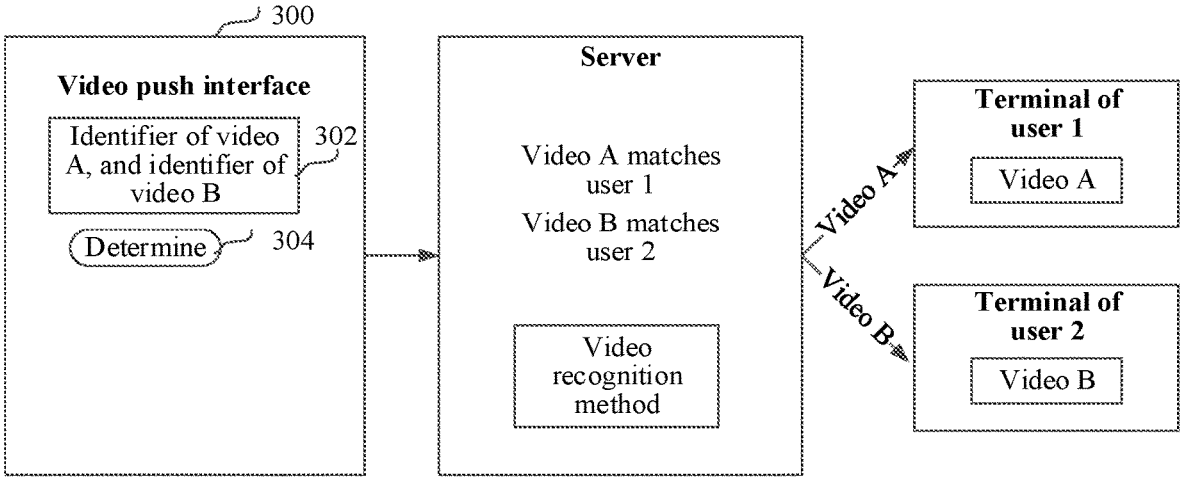
FIG. 3 is a schematic diagram of video recognition using a content recognition method according to some embodiments.

To describe the technical solutions in the embodiments of this disclosure more clearly, the following briefly introduces the accompanying drawings required for describing the embodiments. The accompanying drawings in the following description show some embodiments of this disclosure.

A content recognition method provided in of this disclosure may be applied to an application environment shown in FIG. 1. The application environment includes a terminal 102 and a server 104. The terminal 102 communicates with the server 104 by using a network.

Specifically, the server 104 can acquire, in response to a content recognition request, target content to be recognized. The target content to be recognized may be content carried in the content recognition request or acquired according to a content identifier carried in the content recognition request. The server 104 can acquire a target text (also referred to as a text piece in some examples) from the target content and acquire text-associated data (e.g., a media piece associated with the text piece) associated with the target text from the target content; perform feature extraction on the target text to obtain text-extracted features, and perform feature extraction on the text-associated data to obtain associated extracted features; determine feature association degrees (also referred to as feature association measures) between the associated extracted features and the text-extracted features, the feature association degrees being used for representing an association degree between the target text and the text-associated data; adjust the text-extracted features based on the feature association degrees to obtain adjusted text features; and perform recognition based on the adjusted text features to obtain a content recognition result corresponding to the target content. The server 104 can store the content recognition result in association with the target content, for example, can use the content recognition result as a tag for the target content. The content recognition request may be triggered by the server 104, and may also be sent to the server 104 by other devices such as a terminal.

A client can be installed on the terminal 102, for example, at least one of a video client, a browser client, an instant messaging client, or an education client, etc. can be installed thereon. The terminal 102 can send a content search request to the server 104 through the client in response to a content search operation triggered by a user. The content search request can carry search information. The server 104 can match the search information with the content recognition result, and when the search information matches the content recognition result, send content corresponding to the content recognition result to the terminal 102. The terminal 102 can display, in the client, the content returned by the server 104.

The terminal 102 may be, but is not limited to, a laptop, a smartphone, a smart TV, a desktop computer, a tablet computer, and a portable wearable device. The server 104 may be implemented by an independent server or a server cluster including a plurality of servers. It can be understood that the above-mentioned application scenario is merely an example, and does not constitute a limitation on the content recognition method provided by the embodiments of this disclosure. The method provided by the embodiments of this disclosure can also be used in other application scenarios. For example, the content recognition method provided by this disclosure can be performed by the terminal 102 or the server 104, and can also be performed by the terminal 102 and the server 104 in cooperation. The terminal 102 can upload the recognized content recognition result to the server 104, and the server 104 can store the target content in association with the content recognition result.

In some embodiments, as shown in FIG. 2, a content recognition method is provided. Taking the method being applied to the server 104 in FIG. 1 as an example, the method includes the following steps:

In step 202, target content to be recognized is determined, and, from the target content, a target text and text-associated data associated with the target text are acquired.

The content may be any one of a video, an audio or a text. The content includes text data, and may further include at least one of image data or audio data. The audio data may be, for example, speech data. When the content is a video, the text data in the content may include at least one of subtitles, bullet screens, comments or titles in the video. The image data in the content may be video frames in the video, and the audio data in the content may be audio data such as dubs or music in the video. When the content is audio data, the text data in the content may be text data corresponding to the audio data. For example, when the content is a song, the text data in the content may be lyrics corresponding to the song, and the audio data in the content may be audio frames. The audio frames are obtained by framing the audio. Framing refers to dividing an audio into multiple small segments, and each small segment is a frame.

The target content refers to content to be recognized, which may be at least one of content on which identity recognition is to be performed or content on which scene recognition is to be performed. The identity recognition refers to recognizing the identity of a person appearing in the target content, for example, the identity of the person can be determined by recognizing person information appearing in the target content. The person information may include at least one of the person's name or the person's face. The scene recognition refers to recognizing a scene to which the target content relates. For example, the scene can be determined by recognizing a location appearing in the target content. The target text refers to the text data in the target content, and may include text data at any time in the target content. For example, when the target text is a video, the target text may include at least one of a subtitle, a bullet screen, a comment or a title in the video displayed at any moment or in any time period. When the target content is a song, the target text data may be lyrics corresponding to the song.

The text-associated data refers to data in the target content having an association relationship with the target text, for example, may include at least one of target image data or target audio data in the target content having an association relationship with the target text. The target image data is image data in the target content having an association relationship with the target text. The target audio data is audio data in the target content having an association relationship with the target text. The target image data may include one or more images, and multiple refer to at least two. The target audio data may include one or more audio frames, and multiple refers to at least two.

The association relationship may include a temporal association relationship. For example, the text-associated data may include data in the target content occurring within a time when the target text appears, or data in the target content occurring within a time from which a time interval to the time when the target text appears is less than a time interval threshold. For example, when the target content is a target video and the target text is a subtitle text of the video, the text-associated data may be video frames and speech matching the subtitles. For example, the target text and the corresponding text-associated data may be data describing the same video scene. For example, when the target text is a subtitle appearing at a target time in the target video, the text-associated data may include data in the target video appearing at the target time, for example, may include at least one of a video frame, a bullet screen or an audio frame appearing at the target time in the target video, or include data in the target video occurring at a time from which a time interval to the target time is less than a time interval threshold. The time interval threshold can be set in advance or set as needed. The target video may be any video, which may be a directly recorded video or a video clip captured from the recorded video. The target video may be any type of video, including, but not limited to, at least one of an advertising video, a TV drama video or a news video. The target video may also be a video to be pushed to the user. The video frames in the target video appearing at the target time may include one or more frames, the audio frames in the target video appearing at the target time may include one or more frames, and the multiple frames refer to at least two frames.

The association relationship may further include a semantic association relationship. For example, the text-associated data may include data in the target content that semantically matches the target text. The data that semantically matches the target text may include data semantically consistent with the target text, or data of which semantics differ from the semantics of the target text by less than a semantic difference threshold. The semantic difference threshold can be set in advance or set as needed.

Specifically, the server can acquire content on which entity recognition is to be performed, such as, a video on which entity recognition is to be performed, use the content on which entity recognition is to be performed as the target content to be recognized, recognize, by using the content recognition method provided by this disclosure, the content on which entity recognition is to be performed to obtain recognized entity words, and construct a knowledge graph based on the recognized entity words, or can use the recognized entity words as a tag corresponding to the target content. When the target content needs to be pushed, a user that the target content matches can be determined according to the tag corresponding to the target content, and the target content is pushed to a terminal of the matched user.

Entity refers to an object with a specific meaning, for example, may include at least one of a place name, an institution's name, or a proper noun. The target text may include one or more entities, and the entity words are words that represent the entities. For example, assuming that the target text is "monkeys like to eat bananas", the entities included in the target text are "monkey" and "banana". "Monkey" is an entity word, and "banana" is also an entity word. Knowledge graph is a graph-based data structure, including points and edges. Each point represents an entity, and each edge represents a relationship between entities.

Entity recognition can also be called entity word recognition or Named Entity Recognition (NER). Entity word recognition is an important research direction in the field of Natural Language Processing (NLP). There are many methods for entity word recognition, which, for example, include dictionary- and rule-based methods, include a Hidden Markov Model (HMM), a Maximum Entropy Markov Model (MEMM), Conditional Random Fields (CRFs) and other machine learning methods, include Recurrent Neural Networks (RNNs), a Long Short-Term Memory (LSTM) and other deep learning models, and include LSTM and CRF combined recognition methods. Nature language processing (NLP) is an important direction in the fields of computer science and artificial intelligence. It studies various theories and methods that enable effective communication between humans and computers in natural language.

In some embodiments, a first terminal can send a content push request to a server. The content push request may carry a content identifier corresponding to content to be pushed, and the content identifier is used for uniquely identifying the content. The content to be pushed may be, for example, a video to be pushed. The server can, in response to the content push request, acquire the content to be pushed corresponding to the content identifier carried in the content push request, as the target content to be recognized. For example, the first terminal can display a content push interface. The content push interface can display a push content acquisition area and a content push trigger control. The push content acquisition area is used for receiving content information corresponding to the content to be pushed. The content information includes one or more content identifiers, and multiple refers to at least two. The content push trigger control is used for triggering the first terminal to send the content push request to the server. Upon acquiring a trigger operation on the content push trigger control, the first terminal acquires the content information received in the push content acquisition area, and sends the content push request carrying the content information to the server. The server can acquire content respectively corresponding to the content identifiers included in the content information, as target content to be recognized, respectively. The server can use the content recognition method provided by this disclosure to recognize the content to be recognized, determine, according to a recognition result, users respectively matching the target content, and push the target content to terminals of the matched users. For example, the recognition result can be matched with a user portrait of a user, and when the match is successful, the target content can be pushed to the terminal of the user.

For example, when the content is a video, the content recognition method can also be referred to as a video recognition method. The content push request can also be referred to as a video push request. The content push interface can be, for example, a video push interface 300 in FIG. 3. The push content acquisition area can be, for example, an area 302 in FIG. 3. The content push trigger control can be, for example, an "OK" control 304 in FIG. 3. Upon acquiring a click/tap operation on the "OK" control 304, the terminal can send a video push request to the server. The server recognizes video A and video B according to the video recognition method, determines user 1 that video A matches, and user B that video B matches, pushes video A to the terminal of user 1, and pushes Video B to the terminal of user 2.

In step 204, feature extraction is performed on the target text to obtain text-extracted features, and feature extraction is also performed on the text-associated data to obtain associated extracted features.

The text-extracted features are features obtained by performing feature extraction on the target text. The text-extracted features may be features obtained by performing further feature extraction on target word vectors of target segmented words corresponding to the target text. The target segmented words are obtained by segmenting the target text. The granularity of segmentation can be set as needed, for example, segmentation can be performed in units of words, terms or sentences to obtain segmented text blocks. Each text block is taken as a segmented word. When segmentation is performed in units of words, one word corresponds to one text block, that is, one word is one segmented word. For example, when the target text is "I'm so thirsty", and when word segmentation is performed in units of words, the obtained segmented words are "I'm", "so" and "thirsty", respectively. A target word vector is a vector representation of a target segmented word. There may be one or more target segmented words obtained by segmenting the target text, and multiple refers to at least two.

The associated extracted features are features obtained by performing feature extraction on the text-associated data. When the text-associated data is target image data, the associated extracted features may be target image features obtained by performing image feature extraction on the target image data. When the text-associated data is target audio data, the associated extracted features may be target audio features obtained by performing audio feature extraction on the target audio data. The target image features are image features extracted by performing image feature extraction on the target image data. The target audio features are audio features extracted by performing audio feature extraction on the target audio data. The text-extracted features and the associated extracted features may be of the same dimension, for example, may be vectors of the same dimension or matrices of the same dimension.

Specifically, the server can input the target text into a text feature extraction network in a trained content recognition model, and use the text feature extraction network to perform feature extraction on the target text, to obtain the text-extracted features. The server can input the text-associated data into an associated feature extraction network in the trained content recognition model, and by use the associated feature extraction network to perform feature extraction on the text-associated data, to obtain the associated extracted features. The trained content recognition model is used for recognizing content to obtain a content recognition result, for example, used for recognizing at least one of entity words included in subtitles of a video or a scene of the video. There may be multiple associated feature extraction networks in the trained content recognition model, for example, each associated feature extraction network may include at least one of an image feature extraction network or an audio feature extraction network. The image feature extraction network is used for extracting features of an image. The audio feature extraction network is used for extracting features of an audio. When the text-associated data is the target image data, the text-associated data can be inputted into the image feature extraction network, and image features extracted by the image feature extraction network can be used as the associated extracted features. When the text-associated data is the target audio data, the text-associated data can be inputted into the audio feature extraction network, and audio features extracted by the audio feature extraction network can be used as the associated extracted features.

The text feature extraction network, the image feature extraction network, and the audio feature extraction network may be artificial intelligence-based neural networks, such as Convolutional Neural Networks (CNNs), and certainly may also be other types of neural networks. The text feature extraction network may be, for example, a Transformer network or a Transformer-based Bidirectional Encoder Representations from Transformers (BERT) network. The image feature extraction network may be, for example, a Residual Network (ResNet). The audio feature extraction network may be, for example, a Visual Geometry Group (VGG) convolutional network. VGG stands for a Visual Geometry Group (VGG) at the University of Oxford. For example, the server can perform scale transformation on the target image to obtain a scale-transformed image. Data of the scale-transformed image is inputted into a residual convolutional network for image feature extraction. Pooling is performed on features outputted by a feature map extraction layer in the residual convolutional network, for example, the features are pooled to a fixed size of n*n. The pooled features are taken as the associated extracted features. n is a positive number greater than or equal to 1.

In some embodiments, the step of performing feature extraction on the target text to obtain text-extracted features includes: segmenting the target text to obtain target segmented words; performing vector transformation on the target segmented words to obtain target word vectors corresponding to the target segmented words; and taking the target word vectors as the text-extracted features.

In some embodiments, the server can input the target text into an attention-based transformer model. As an encoder for text features, the transformer model can encode the target text to obtain encoded features of embedding representation for each word in the target text. The encoded feature corresponding to each word can be used as a text-extracted feature.

In some embodiments, the server can perform frequency spectrum calculation on target audio data to obtain a spectrogram corresponding to the target audio data, perform feature extraction on the spectrogram corresponding to the target audio data, and use the extracted features as the associated extracted features. For example, the server can perform sound spectrum calculation on the spectrogram corresponding to the target audio data, to obtain sound spectrum information corresponding to the target audio data, and perform feature extraction on the sound spectrum information corresponding to the target audio data to obtain the associated extracted features. For example, the server can perform Fourier transformation on the target audio data by using a hann (hanning window) time window, to obtain the spectrogram corresponding to the target audio data, calculate the spectrogram through a mel filter to obtain the sound spectrum information corresponding to the target audio data, perform feature extraction on the sound spectrum information by using a VGG convolutional network, and take the audio features obtained by the feature extraction as the associated extracted features.

In step 206, feature association degrees between the associated extracted features and the text-extracted features are determined, the feature association degrees are used for representing an association degree between the target text and the text-associated data.

The feature association degrees are a result obtained by performing association calculation on the associated extracted features and the text-extracted features. The greater the association degree is, the stronger the association relationship is. The feature association degrees may include at least one of image association degrees or audio association degrees. The image association degrees refer to a result obtained by performing association calculation on the target image features and the text-extracted features. The audio association degrees refer to a result obtained by performing association calculation on the target audio features and the text-extracted features. The association calculation may be at least one of product operation or summation operation.

The associated extracted features may include multiple ordered associated feature values. The text-extracted features may include multiple ordered text feature values. The text feature values refer to feature values included in the text-extracted features. The associated feature values refer to feature values included in the associated extracted features. The text-extracted features and the associated extracted features may be of the same dimension, for example, may be vectors or matrices of the same dimension. That is, the number of the associated feature values included in the associated extracted features may be the same as the number of the text feature values included in the text-extracted features. For example, assuming that a text-extracted feature is vector A=[a1, a2, a3], and an associated extracted feature is vector B=[b1, b2, b3]. Vector A includes three elements, which are a1, a2 and a3, respectively. Each element in vector A is a text feature value. Similarly, vector B includes three elements, which are b1, b2 and b3. Each element in vector B is an associated feature value.

Specifically, the association calculation may be at least one of product operation or summation operation. When the association calculation is product operation, the product operation can be performed on the associated feature values in the associated extracted features and the text feature values at corresponding positions in the text-extracted features to obtain product operation values. Statistical operation is performed on the product operation values, for example, summation operation or mean operation is performed on the product operation values to obtain statistical operation results. The feature association degrees are obtained based on the statistical operation results. For example, the statistical operation results can be used as the feature association degrees, or normalization processing can be performed on the statistical operation results, and normalization processing results are used as the feature association degrees. When the association calculation is summation operation, the summation operation can be performed on the associated feature values in the associated extracted features and the text feature values at corresponding positions in the text-extracted features to obtain summation operation values. Statistical operation is performed on the summation operation values, for example, summation operation or mean operation is performed on the summation operation values to obtain statistical operation results.

In some embodiments, there are multiple target segmented words obtained by segmenting the target text. The server can acquire the text-extracted features obtained according to the target segmented words, form the text-extracted features into a matrix, and use the formed matrix as a text-extracted feature matrix. Each column in the text-extracted feature matrix is a text-extracted feature. The server can perform product operation on the associated extracted features and the text-extracted features to obtain a total product operation result, and determine, based on the total product operation result, the feature association degrees respectively corresponding to the text-extracted features. The step of performing product operation on the associated extracted features and the text-extracted features to obtain the total product operation result may include: respectively multiplying the text-extracted features in the text-extracted feature matrix by the associated extracted features to obtain sub-product operation results respectively corresponding to the text-extracted features; and taking the sub-product operation results as the total product operation result. The step of respectively multiplying the text-extracted features in the text-extracted feature matrix by the associated extracted features to obtain sub-product operation results respectively corresponding to the text-extracted features may include: performing product operation on the text feature values in the text-extracted features and the associated feature values at corresponding positions in the associated extracted features to obtain the sub-product operation results respectively corresponding to the text-extracted features. The step of determining, based on the total product operation result, the feature association degrees respectively corresponding to the text-extracted features may include: performing normalization processing on the sub-product operation results in the total product operation result to obtain normalized sub-product operation results, and taking the normalized sub-product operation results as the feature association degrees corresponding to the text-extracted features.

In some embodiments, when the text-associated data is target image data, and there are multiple pieces of target image data, the server can form the target image features corresponding to the target image data into a matrix, and take the formed matrix as an image feature matrix. Each column in the image feature matrix is a target image feature. The server can perform matrix multiplication operation on a transposed matrix of the target image feature matrix and the text-extracted feature matrix to obtain a first product matrix, perform normalization processing on matrix values in the first product matrix to obtain a normalized first product matrix, and determine, based on the normalized first product matrix, image association degrees respectively corresponding to the text-extracted features. The normalized first product matrix includes the image association degrees respectively corresponding to the text-extracted features.

For example, assuming that the target text is "I'm so thirsty", the target text is segmented in units of words to obtain three target segmented words, which are "I'm", "so" and "thirsty", respectively. One segmented word is one word. The dimension of target word vectors corresponding to the target segmented words is 2. The target word vector corresponding to "I'm" is A=(a1, a2)T, the target word vector corresponding to "so" is B=(b1, b2)T, and the target word vector corresponding to "thirsty" is C=(c1, c2)T. By taking each target word vector as a text-extracted feature, the text-extracted feature matrix $feature_{text}$ can be expressed as formula (1). Assuming that there are three pieces of target image data. The three pieces of target image data may be the same or different, for example, be three images. The target image features respectively corresponding to the target image data are R=(r1, r2)T, M=(m1, m2)T, and N=(n1, n2)T. R, M and N may be the same or different. The target image feature matrix $feature_{image}$ can be expressed as formula (2). The first product matrix L1 can be expressed as formula (3).

$$feature_{text} = [A, B, C] = \begin{bmatrix} a1 & b1 & c1 \\ a2 & b2 & c2 \end{bmatrix} \tag{1}$$

$$feature_{image} = [R, M, N] = \begin{bmatrix} r1 & m1 & n1 \\ r2 & m2 & n2 \end{bmatrix} \tag{2}$$

$$L1 = \left[ feature_{image} \right]^T \left[ feature_{text} \right] \tag{3}$$

In some embodiments, the step of performing normalization processing on the matrix values in the first product matrix to obtain the normalized first product matrix includes: determining a scaling factor; dividing the matrix values in the first product matrix by the scaling factor separately, to obtain scaling values corresponding to the matrix values; performing normalization processing on the scaling values; and taking a matrix formed by the scaling values as the normalized first product matrix. The scaling factor can be set in advance or set as needed. For example, the scaling factor can be determined according to the dimension of the text-extracted features. For example, the scaling factor can be positively correlated with the dimension of the text-extracted features. For example, a square root of the dimension of the text-extracted features can be calculated to obtain the scaling factor. For example, square root processing can be performed on the dimension of the text-extracted features, and a ratio of the result of the square root processing to a first numerical value can be used as the scaling factor. The first numerical value can be set in advance. The method used for normalization processing may be any function capable of converting input data into a number between 0 and 1. For example, function softmax can be used for normalization processing. For example, the normalized first product matrix L2 can be obtained by calculation using formula (4). d is the dimension of the text-extracted features, and m is the first numerical value.

$$L2 = \text{softmax}\left(\frac{[feature_{image}]^T [feature_{text}]}{\sqrt{d}/m}\right) \quad (4)$$

Similarly, when the text-associated data is target audio data, and there are multiple pieces of target audio data, the server can form the target audio features corresponding to the target audio data into a target audio feature matrix. Each column in the target audio feature matrix is a target audio feature. The server can perform matrix multiplication operation on a transposed matrix of the target audio feature matrix and the text-extracted feature matrix to obtain a second product matrix, perform normalization processing on matrix values in the second product matrix to obtain a normalized second product matrix, and determine, based on the normalized second product matrix, audio association degrees respectively corresponding to the text-extracted features. The normalized second product matrix includes the audio association degrees respectively corresponding to the text-extracted features.

In step 208, the text-extracted features are adjusted based on the feature association degrees to obtain adjusted text features.

The adjusted text features are features obtained by adjusting the text-extracted features based on the feature association degrees. The adjusted text features may include at least one of first adjusted text features or second adjusted text features. The first adjusted text features refer to features obtained by adjusting the text-extracted features based on image attention intensities. The second adjusted text features refer to features obtained by adjusting the text-extracted features based on audio attention intensities.

Specifically, the server can obtain feature attention intensities corresponding to the text-extracted features based on the feature association degrees. The feature association degrees are positively correlated with the feature attention intensities. The text-extracted features are adjusted based on the feature attention intensities to obtain the adjusted text features. The feature association degrees are positively correlated with the feature attention intensities. When the target segmented words corresponding to the text-extracted features are different, the feature attention intensities corresponding to the text-extracted features can be different. For example, the feature association degrees can be taken as the feature attention intensities, or linear operation or nonlinear operation can be performed on the feature association degrees, and the operation result can be taken as the feature attention intensities. The linear operation includes at least one of summation operation or product operation. The nonlinear operation includes at least one of exponent operation or logarithm operation. A positive correlation relationship refers to that: in a case that other conditions remain unchanged, two variables change in the same direction, i.e., when one variable changes from large to small, the other variable also changes from large to small. It is to be understood that the positive correlation refers to that a direction of change is consistent, but it does not require that when one variable changes a little, the other variable also needs to change. For example, when variable a is 10 to 20, variable b can be set to 100, and when variable a is 20 to 30, variable b can be set to 120. In this way, both a and b change in a direction that as a becomes larger, b also becomes larger. However, when a is in the range of 10 to 20, b may be unchanged.

The feature attention intensities may include at least one of image attention intensities or audio attention intensities. The image attention intensities are obtained based on the image association degrees, and the image attention intensities are positively correlated with the image association degrees. The audio attention intensities are obtained based on the audio association degrees, and the audio attention intensities are positively correlated with the audio association degrees. The feature attention intensities are used for reflecting the intensities of attention to features. The greater the feature attention intensities are, the more attention needs to be paid to the features during content recognition.

In some embodiments, the server can perform similarity calculation on the associated extracted features and the text-extracted features to obtain feature similarities. The feature similarities are taken as the feature association degrees. The feature attention intensities corresponding to the text-extracted features are obtained based on the feature association degrees. For example, similarity calculation can be performed on the associated extracted features and the text-extracted features according to a cosine similarity calculation formula, and the calculated cosine similarities are taken as the feature similarities.

In some embodiments, the server can adjust the text feature values in the text-extracted features by using the feature attention intensities, to obtain the adjusted text features. For example, the server can perform linear operation on the text feature values and the feature attention intensities to obtain text feature values after the linear operation, and obtain the adjusted text features based on the text feature values after the linear operation. The linear operation may include at least one of summation operation or product operation. For example, the server can multiply the feature attention intensities respectively with the feature values in the text-extracted features to obtain feature value products, and rank the feature value products according to positions of the feature values in the text-extracted features to obtain a feature value sequence. The feature value sequence is taken as the adjusted text features. The positions of the text feature values in the text-extracted features are the same as the positions of the feature value products calculated from the text feature values in the feature value sequence. For example, assuming that a text-extracted feature is a vector [a1, a2, a3], a1, a2 and a3 are feature values in the text-extracted feature. When a feature attention intensity is c, the feature value sequence is a vector [a1*c, a2*c, a3*c], where a1*c, a2*c and a3*c are feature value products. The position of a1*c in the feature value sequence [a1*c, a2*c, a3*c] is the same as the position of a1 in the text-extracted feature [a1, a2, a3].

In some embodiments, the server can adjust the text-extracted features by using the normalized first product matrix, to obtain a first adjusted text feature matrix. The normalized first product matrix includes the image association degrees respectively corresponding to the text-extracted features. The first adjusted text feature matrix may include the first adjusted text features respectively corresponding to the text-extracted features. For example, the server can perform matrix multiplication operation on the normalized first product matrix and the text-extracted feature matrix, and take a transposed matrix of the matrix obtained by multiplication as the first adjusted text feature matrix. For example, the first adjusted text feature matrix $feature_{fusion1}$ can be obtained by calculation using formula (5), where $feature_{fusion1}$ represents the first adjusted text feature matrix, and $[feature_{fusion1}]^T$ represents the transposed matrix of $feature_{fusion1}$. Similarly, the server can perform matrix multiplication operation on the normalized second product matrix and a transposed matrix of the text-extracted features to obtain a second adjusted text feature matrix. The normalized second product matrix includes the audio association degrees respectively corresponding to the text-extracted features. The second adjusted text feature matrix may include the second adjusted text features respectively corresponding to the text-extracted features. For example, the second adjusted text feature matrix $feature_{fusion2}$ be obtained by calculation using formula (6), where $feature_{audio}$ is a target audio feature matrix. $[feature_{audio}]^T$ represents a transposed matrix corresponding to the target audio feature matrix.

$$\left[feature_{fusion1}\right]^T = \text{softmax}\left(\frac{[feature_{image}]^T[feature_{text}]}{\sqrt{d}/m}\right)[feature_{text}]^T \quad (5)$$

$$\left[feature_{fusion2}\right]^T = \text{softmax}\left(\frac{[feature_{audio}]^T[feature_{text}]}{\sqrt{d}/m}\right)[feature_{text}]^T \quad (6)$$

In step 210, recognition is performed based on the adjusted text features to obtain a content recognition result corresponding to the target content.

The content recognition result is a result obtained by recognition based on the adjusted text features. The content recognition result can be determined according to a content recognition network used during recognition. If content recognition networks are different, the obtained content recognition results may be the same or different. The content recognition network may include at least one of a scene recognition network or an entity recognition network. The scene recognition network is used for recognizing a scene, and the entity recognition network is used for recognizing an entity. When the content recognition network is a scene recognition network, the content recognition model can also be called a scene recognition model. When the content recognition network is an entity recognition network, the content recognition model can also be called an entity recognition model or an entity word recognition model.

Specifically, the server can input the adjusted text features into a content recognition network of a trained content recognition model, and use the content recognition model to recognize the adjusted text features to obtain the content recognition result corresponding to the target content. For example, when the text-extracted features are features corresponding to the target segmented words in the target text, the adjusted text features respectively corresponding to the target segmented words can be ranked according to order of the target segmented words in the target text, and a sequence obtained by ranking can be taken as a feature sequence. The server can perform recognition based on the feature sequence to obtain the content recognition result corresponding to the target content, for example, can input the feature sequence into the content recognition network of the content recognition model to obtain the content recognition result. For example, when the content recognition network is an entity recognition network, entity words included in the target content can be recognized.

Figure 4:
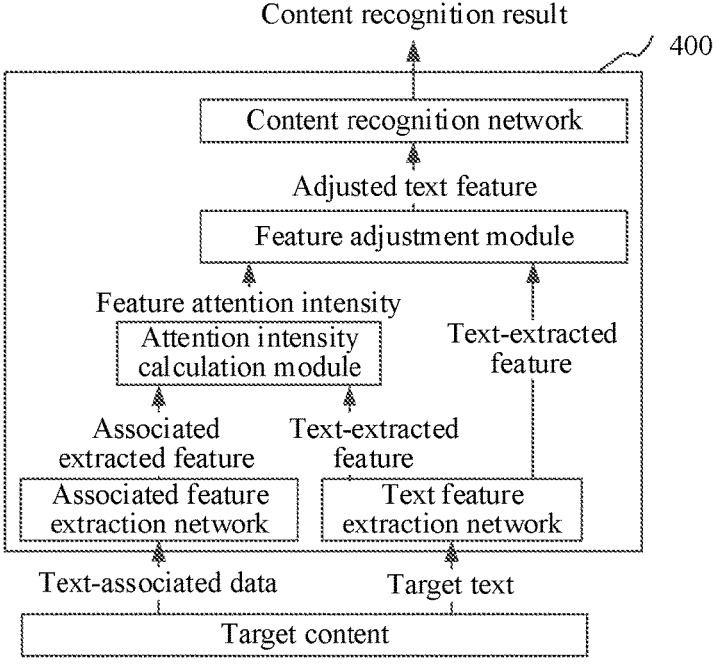
FIG. 4 is a frame diagram of a content recognition model according to some embodiments.

As shown in FIG. 4, FIG. 4 shows a content recognition model 400. The content recognition model 400 includes a text feature extraction network, an associated feature extraction network, an attention intensity calculation module, a feature adjustment module, and a content recognition network. The attention intensity calculation module is configured to perform association calculation on associated extracted features and text-extracted features to obtain feature attention intensities. The feature adjustment module is configured to adjust the text-extracted features based on the feature attention intensities to obtain adjusted text features, and input the adjusted text features into the content recognition network to obtain a content recognition result corresponding to target content. Each network and each module in the content recognition model 400 are obtained through joint training. The server acquires a target text and text-associated data from the target content, inputs the target text into the text feature extraction network to obtain the text-extracted features, inputs the text-associated data into the associated feature extraction network to obtain the associated extracted features, inputs the text-extracted features and the associated extracted features into the attention intensity calculation module to obtain the feature attention intensities, inputs the feature attention intensities and the text-extracted features into the feature adjustment module to obtain the adjusted text features, and inputs the adjusted text features into the content recognition network to obtain the content recognition result.

In some embodiments, the server can also fuse the adjusted text features and the text-extracted features to obtain fused text features, for example, can perform statistical operation, such as weighted calculation or mean calculation, on the adjusted text features and the text-extracted features to obtain the fused text features. For example, the server can determine adjusted-feature weights corresponding to the adjusted text features, and fuse the adjusted text features and the text-extracted features based on the adjusted-feature weights to obtain the fused text features. The server can perform recognition based on the fused text features to obtain the content recognition result corresponding to the target content.

In some embodiments, the adjusted text features include first adjusted text features and second adjusted text features. The server can perform fusion, such as weighted calculation or mean calculation, based on the first adjusted text features, the second adjusted text features, and the text-extracted features to obtain the fused text features. For example, the adjusted-feature weights may include first feature weights corresponding to the first adjusted text features and second feature weights corresponding to the second adjusted text features. The server can fuse the first adjusted text features and the text-extracted features based on the first feature weights to obtain first fused features, fuse the second adjusted text features and the text-extracted features based on the second feature weights to obtain second fused features, perform statistical operation on the first fused features and the second fused features, and use the result of statistical operation as the fused text features. For example, the feature values at corresponding positions in the first fused features and the second fused features are summed to obtain summed values. The summed values are ranked according to the positions of the feature values in the first fused features or the second fused features. Sequences obtained by ranking are taken as the fused text features.

In the content recognition method, target content to be recognized is determined; a target text and text-associated data associated with the target text are acquired from the target content; feature extraction is performed on the target text to obtain text-extracted features, and feature extraction is performed on the text-associated data to obtain associated extracted features; feature association degrees between the associated extracted features and the text-extracted features are determined, and the feature association degrees are used for representing an association degree between the target text and the text-associated data; the text-extracted features are adjusted based on the feature association degrees to obtain adjusted text features; and recognition is performed based on the adjusted text features to obtain a content recognition result corresponding to the target content. Since the feature association degrees are used for representing the association degree between the target text and the text-associated data, adjusting the text-extracted features based on the feature association degrees implements adaptive adjustment of text features according to the association degree between the text-associated data and the target text. Therefore, when recognition is performed based on the adjusted text features, the recognition result is affected by the text-associated data. The greater the association degree between the target text and the text-associated data is, the greater the influence of the text-associated data on the recognition result is, so that more attention is paid to information with a greater association degree during content recognition, thereby improving the accuracy of content recognition.

In some embodiments, performing recognition based on the adjusted text features to obtain the content recognition result corresponding to the target content includes: fusing the adjusted text features and the text-extracted features to obtain fused text features; and performing recognition based on the fused text features to obtain the content recognition result corresponding to the target content.

The fused text features are features obtained by fusing the adjusted text features and the text-extracted features. The fused text features, the adjusted text features and the text-extracted features may be of the same dimension, for example, may be vectors or matrices of the same dimension.

Specifically, the server can perform statistical operation, such as mean operation or summation operation, on the adjusted text features and the text-extracted features, and take the result of statistical operation as the fused text features. For example, the server can encode the text-extracted features to obtain encoded features corresponding to the text-extracted features as first encoded features, encode the adjusted text features to obtain encoded features corresponding to the adjusted text features as second encoded features, perform statistical operation, such as mean operation or summation operation, on the first encoded features and the second encoded features, and take the result of operation as the fused text features.

In some embodiments, the server can input the fused text features into a content recognition network of a trained content recognition model, and use the content recognition network to recognize the fused text features to obtain the content recognition result corresponding to the target content.

In this embodiment, fusing the adjusted text features and the text-extracted features to obtain the fused text features, and performing recognition based on the fused text features to obtain the content recognition result corresponding to the target content can improve the accuracy of content recognition.

In some embodiments, fusing the adjusted text features and the text-extracted features to obtain the fused text features includes: encoding the text-extracted features to obtain first encoded features, and encoding the adjusted text features to obtain second encoded features; fusing the first encoded features and the second encoded features to obtain fused encoded features; obtaining adjusted-feature weights corresponding to the adjusted text features based on the fused encoded features; and fusing the adjusted text features and the text-extracted features based on the adjusted-feature weights to obtain the fused text features.

The first encoded features are features obtained by encoding the text-extracted features. The second encoded features are features obtained by encoding the adjusted text features. The fused encoded features are features obtained by fusing the first encoded features and the second encoded features. The adjusted-feature weights are obtained based on the fused encoded features.

Specifically, the content recognition model may further include a first encoder, a second encoder, and a feature fusion module. The feature fusion module is configured to fuse the first encoded features with the second encoded features to obtain the fused encoded features. The server can input the text-extracted features into the first encoder in the trained content recognition model for encoding to obtain the first encoded features, inputs the adjusted text features into the second encoder of the trained content recognition model for encoding to obtain the second encoded features, and fuse the first encoded features with the second encoded features. For example, the server can input the first encoded features and the second encoded features into the feature fusion module to obtain the fused encoded features. The first encoder and the second encoder may be artificial intelligence-based neural networks. Each network and module in the content recognition model may be obtained by joint training, for example, the first encoder and the second encoder are obtained by joint training.

In some embodiments, the server can perform statistical operation on the first encoded features and the second encoded features to obtain encoded statistical features. For example, the server can perform addition operation on the first encoded features and the second encoded features, and take the result of addition operation as the fused encoded features, or perform mean operation on the first encoded features and the second encoded features, and take the calculated mean values as the fused encoded features. The server can determine the fused encoded features based on the encoded statistical features, for example, can take the encoded statistical features as the fused encoded features.

In some embodiments, the server can perform normalization processing on the fused encoded features, and take the result obtained by normalization as the adjusted-feature weights corresponding to the adjusted text features. For example, the trained content recognition model may include an activation layer. The activation layer can convert data into data between 0 and 1. The step of performing normalization processing on the fused encoded features, and taking the result obtained by normalization as the adjusted-feature weights may include: inputting the fused encoded features into the activation layer of the content recognition model for activation processing, and taking the result of activation processing as the adjusted-feature weights corresponding to the adjusted text features.

In some embodiments, the server can perform product operation on the adjusted-feature weights and the adjusted text features to obtain calculated adjusted text features, perform statistical operation, such as summation operation or mean operation, on the calculated adjusted text features and the text-extracted features, and take the result of statistical operation as the fused text features.

In some embodiments, the server can determine text feature weights corresponding to the text-extracted features, for example, can acquire preset weights, and take the preset weights as the text feature weights. The preset weights may be weights preset as needed. The text feature weights can also be determined according to the adjusted-feature weights. For example, the adjusted-feature weights can be negatively correlated with the text feature weights. The sum of the adjusted-feature weights and the text feature weights may be a preset numerical value. The preset numerical value can be preset as needed, for example, can be 1. For example, results obtained by subtracting the text feature weights from the preset numerical value can be used as the text feature weights. For example, when the adjusted-feature weights are 0.3, the text feature weights can be 0.7. The preset numerical value is greater than the text feature weights, and the preset numerical value is greater than the adjusted-feature weights. A negative correlation relationship refers to that: in a case that other conditions remain unchanged, two variables change in opposite directions, i.e., when one variable changes from large to small, the other variable changes from small to large. It is to be understood that the negative correlation refers to that a direction of change is opposite, but it does not require that when one variable changes a little, the other variable also needs to change.

In some embodiments, the first encoder may include at least one of a first text encoder or a second text encoder. The second encoder may include at least one of an image encoder or an audio encoder. The first encoded features may include at least one of first text features or second text features. The first text features are features obtained by encoding the text-extracted features using the first text encoder. The second text features are features obtained by encoding the text-extracted features using the second text encoder. The second encoded features may include at least one of image encoded features or audio encoded features. The image encoded features are features obtained by encoding the first adjusted text features using the image encoder. The audio encoded features are features obtained by encoding the second adjusted text features using the audio encoder. The fused encoded features may include at least one of text image encoded features or text audio encoded features. The text image encoded features are features obtained by fusing the first text encoded features and the image encoded features. The text audio encoded features are features obtained by fusing the second text encoded features and the audio encoded features. For example, when the adjusted text features are the first adjusted text features, the server can input the text-extracted features into the first text encoder for encoding to obtain the first text features, input the first adjusted text features into the image encoder for encoding to obtain the image encoded features, and fuse the first text features with the image encoded features to obtain the text image encoded features. When the adjusted text features are the second adjusted text features, the server can input the text-extracted features into the second text encoder for encoding to obtain the second text features, input the second adjusted text features into the audio encoder for encoding to obtain the audio encoded features, and fuse the second text features with the audio encoded features to obtain the text audio encoded features. The text image encoded features and the text audio encoded features can be used as the fused encoded features. The first text encoder and the second text encoder may be the same encoder or different encoders. The image encoder and the audio encoder may be the same encoder or different encoders.

In this embodiment, the text-extracted features are encoded to obtain first encoded features, and the adjusted text features are encoded to obtain second encoded features; the first encoded features and the second encoded features are fused to obtain the fused encoded features; the adjusted-feature weights corresponding to the adjusted text features are obtained based on the fused encoded features; and the adjusted text features and the text-extracted features are fused based on the adjusted-feature weights to obtain the fused text features. Therefore, the fused text features can reflect both the text-extracted features and the adjusted text features, thereby improving the expression ability of the fused text features. When recognition is performed based on the adjusted text features, the accuracy of recognition can be improved.

In some embodiments, the first encoded features are obtained by encoding through the first encoder in the trained content recognition model. The second encoded features are obtained by encoding through the second encoder in the content recognition model. Obtaining the adjusted-feature weights corresponding to the adjusted text features based on the fused encoded features includes: inputting the fused encoded features into a target activation layer in the content recognition model for activation processing to obtain target activation values, and taking the target activation values as the adjusted-feature weights corresponding to the adjusted text features, the target activation layer being a shared activation layer of the first encoder and the second encoder.

Figure 5:
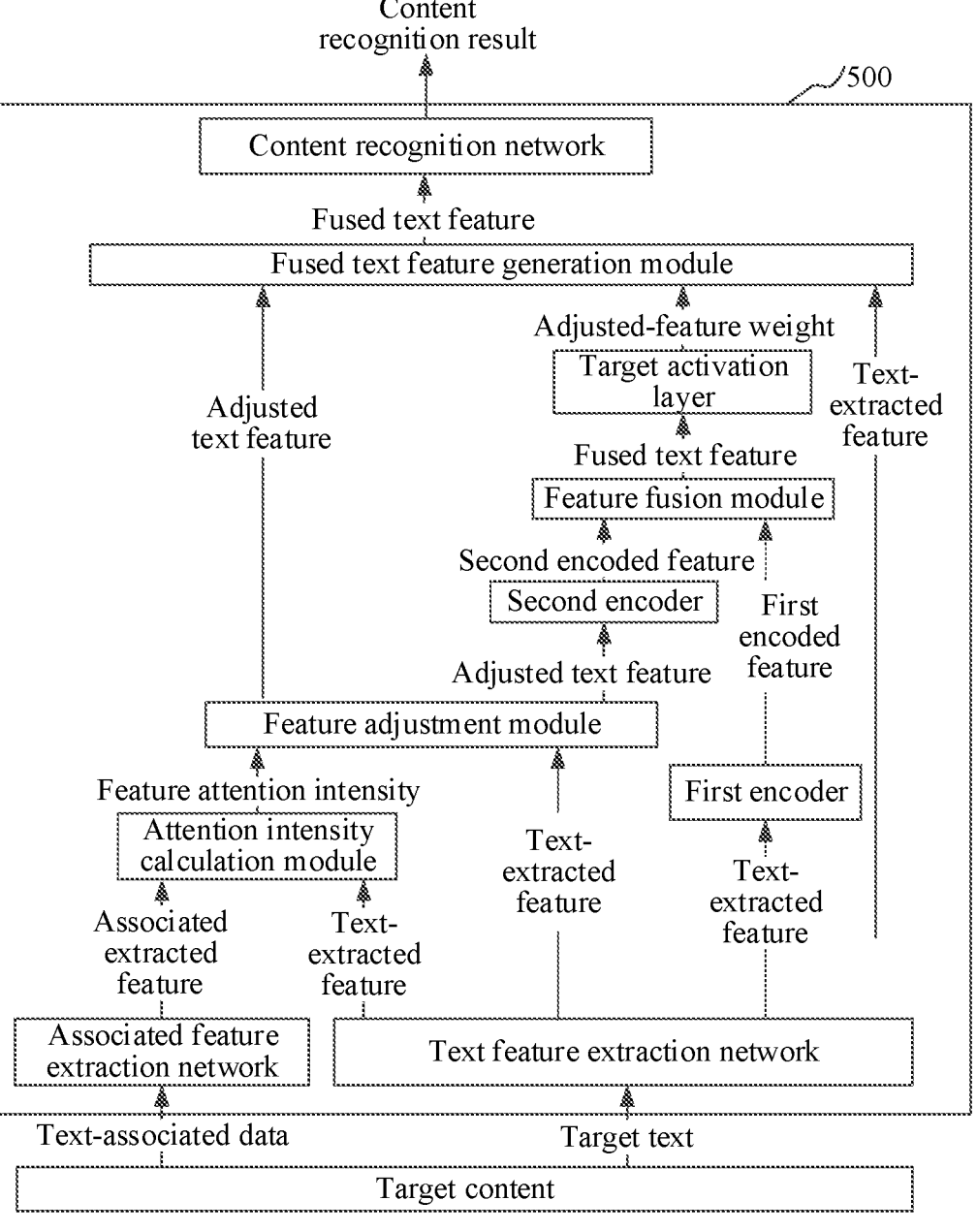
FIG. 5 is a frame diagram of a content recognition model according to some embodiments.

The activation layer can convert data into data between 0 and 1, which can be achieved by an activation function. The activation function includes, but is not limited to, at least one of a Sigmoid function, a tan h function, or a Relu function. The target activation layer is the activation layer in the trained content recognition model, and is the activation layer shared by the first encoder and the second encoder. That is, a target activation layer set can receive output data of the first encoder, and can also receive output data of the second encoder. The target activation values are results obtained by using the target activation layer to activate the fused encoded features. The target activation values and the fused encoded features may be of the same dimension, for example, may be vectors or matrices of the same dimension. As shown in FIG. 5, FIG. 5 shows a content recognition module 500. The content recognition module 500 includes an associated feature extraction network, an attention intensity calculation module, a text feature extraction network, a feature adjustment module, a first encoder, a second encoder, a feature fusion module, a target activation layer, a fused text feature generation module, and a content recognition network. The feature fusion module is configured to fuse first encoded features and second encoded features to obtain fused encoded features. The fused text feature generation module is configured to fuse adjusted text features and text-extracted features based on adjusted-feature weights to obtain fused text features.

Specifically, the target activation layer may include at least one of a first activation layer shared by the first text encoder and the image encoder, and a second activation layer shared by the second text encoder and the audio encoder. The target activation value may include at least one of first activation values obtained by activating the text image encoded features, or second activation values obtained by activating the text audio encoded features. When the fused encoded features are the text image encoded features, the server can input the text image encoded features into the first activation layer for activation to obtain the first activation values, and take the first activation values as the first feature weights corresponding to the first adjusted text features. When the fused encoded features are the text audio encoded features, the server can input the text audio encoded features into the second activation layer for activation to obtain the second activation values, and take the second activation values as the second feature weights corresponding to the second adjusted text features. The first feature weights and the second feature weights are taken as the adjusted-feature weights.

In some embodiments, when the adjusted text features are first adjusted text features, and there are multiple first adjusted text features, the server can perform matrix fusion on a first adjusted text feature matrix and a text-extracted feature matrix. For example, the text-extracted feature matrix can be inputted into the first text encoder for encoding to obtain first matrix encoded features. The first adjusted text feature matrix can be inputted into the image encoder for encoding to obtain second matrix encoded features. Statistical operation is performed on the first matrix encoded features and the second matrix encoded features to obtain a first matrix feature statistics result, and normalization processing is performed on the first matrix feature statistics result. For example, the first matrix feature statistics result can be inputted into the first activation layer for activation to obtain a normalized first matrix feature statistics result. The normalized first matrix feature statistics result may include the first feature weights respectively corresponding to the first adjusted text features. For example, the normalized first matrix feature statistics result $gate_1$ can be obtained by calculation using formula (7). $gate_1$ represents the normalized first matrix feature statistics result, sigmoid is the activation function, $$W_1^T$$

is a model parameter of the first text encoder, and $$W_2^T$$

is a model parameter of the image encoder.

$$gate_1 = sigmoid(W_1^T feature_{text} + W_2^T feature_{fusion1}) \qquad (7)$$

In some embodiments, when the adjusted text features are second adjusted text features, and there are multiple second adjusted text features, the server can perform matrix fusion on a second adjusted text feature matrix and a text-extracted feature matrix. For example, the text-extracted feature matrix can be inputted into the second text encoder for encoding to obtain third matrix encoded features. The second adjusted text feature matrix can be inputted into the audio encoder for encoding to obtain fourth matrix encoded features. Statistical operation is performed on the third matrix encoded features and the fourth matrix encoded features to obtain a second matrix feature statistics result, and normalization processing is performed on the second matrix feature statistics result. For example, the first matrix feature statistics result can be inputted into the second activation layer for activation to obtain a normalized second matrix feature statistics result. The normalized second matrix feature statistics result may include the second feature weights respectively corresponding to the second adjusted text features. For example, the normalized second matrix feature statistics result $gate_2$ can be obtained by calculation using formula (8). $gate_2$ represents the normalized second matrix feature statistics result, $$W_3^T$$

is a model parameter of the second text encoder, and $$W_4^T$$

is a model parameter of the audio encoder.

$$gate_2 = sigmoid(W_3^T feature_{text} + W_4^T feature_{fusion2}) \qquad (8)$$

In this embodiment, the fused encoded features are inputted into the target activation layer in the content recognition model for activation processing to obtain the target activation values, and the target activation values are taken as the adjusted-feature weights corresponding to the adjusted text features, so that the adjusted-feature weights are normalized values, and the rationality of the adjusted-feature weights is improved.

In some embodiments, fusing the adjusted text features and the text-extracted features based on the adjusted-feature weights to obtain the fused text features includes: obtaining text feature weights corresponding to the text-extracted features based on the adjusted-feature weights; performing product operation on the adjusted-feature weights and the adjusted text features to obtain calculated adjusted text features; performing product operation on the text feature weights and the text-extracted features to obtain calculated text-extracted features; and adding the calculated adjusted text features and the calculated text-extracted features to obtain the fused text features.

The text feature weights can also be determined according to the adjusted-feature weights. The text feature weights can be negatively correlated with the adjusted-feature weights. For example, results obtained by subtracting the text feature weights from a preset numerical value can be used as the text feature weights. The preset numerical value is greater than the text feature weights, and the preset numerical value is greater than the adjusted-feature weights.

Specifically, the server can use the results of multiplying the adjusted-feature weights by the adjusted text features as the calculated adjusted text features, can use the results of multiplying the text feature weights by the text-extracted features as the calculated text-extracted features, and can use the result obtained by adding the calculated adjusted text features and the calculated text-extracted features as the fused text features.

In some embodiments, the adjusted-feature weights include first feature weights and second feature weights. The text feature weights may include first text weights obtained based on the first feature weights and second text weights obtained based on the second feature weights. The first text weights are negatively correlated with the first feature weights. The second text weights are negatively correlated with the second feature weights. The server can use the first feature weights, the second feature weights, the first text weights and the second text weights to perform weighted calculation on the first adjusted text features, the second adjusted text features and the text-extracted features, and take the result of weighted calculation as the fused text features. For example, the server can use the first feature weights and the first text weights to perform weighted calculation on the first adjusted text features and the text-extracted features to obtain first weighted values, use the second feature weights and the second text weights to perform weighted calculation on the second adjusted text features and the text-extracted features to obtain second weighted values, and take the result of adding the first weighted values and the second weighted values as the fused text features. Specifically, the server can perform product operation on the first text weights and the text-extracted features to obtain first product values, perform product operation on the first feature weights and the first adjusted text features to obtain second product values, perform product operation on the second text weights and the text-extracted features to obtain third product values, perform product operation on the second feature weights and the second adjusted text features to obtain fourth product values, and take the result of adding the first product values, the second product values, the third product values, and the fourth product values as the fused text features.

In some embodiments, the server can use the normalized first matrix feature statistics result and the normalized second matrix feature statistics result to perform weighted calculation on the first adjusted text feature matrix and the second adjusted text feature matrix, to obtain a fused text feature matrix. The fused text feature matrix may include fused text features respectively corresponding to the text-extracted features. For example, the fused text feature matrix output can be obtained by calculation using formula (9). output refers to the fused text feature matrix.

$$\text{output} = \text{feature}_{fusion1} \cdot \text{gate}_1 + (1 - \text{gate}_1)\text{feature}_{text} + \text{feature}_{fusion2} \cdot \text{gate}_2 + (1 - \text{gate}_2)\text{feature}_{text} \quad (9)$$

In this embodiment, product operation is performed on the adjusted-feature weights and the adjusted text features to obtain the calculated adjusted text features, and product operation is performed on the text feature weights and the text-extracted features to obtain the calculated text-extracted features; and the calculated adjusted text features and the calculated text-extracted features are added to obtain the fused text features. Since the text feature weights are obtained based on the adjusted-feature weights, the accuracy of the text feature weights are improved, thereby improving the accuracy of the fused text features.

In some embodiments, the target content is a target video. Acquiring, from the target content, the target text and the text-associated data associated with the target text includes: acquiring a text corresponding to a target time in the target video to obtain the target text; and acquiring video-related data corresponding to the target time in the target video, and taking the video-related data as the text-associated data associated with the target text, the video-related data including at least one of a video frame or an audio frame.

A video frame is the smallest unit constituting a video. A video is composed of multiple images. An image in a video is called a frame or a video frame. The target video may be any video, which may be a directly recorded video or a video clip captured from the recorded video. The target video may be any type of video, including, but not limited to, at least one of an advertising video, a TV drama video or a news video. The target video may also be a video to be pushed to the user. The target time may be any time point or time period from a beginning time point to an ending time point of the target video. The video-related data refers to any data displayed or played at the target time in the target video, and may include at least one of a video frame displayed at the target time or an audio frame played at the target time in the target video. The video frame displayed at the target time may include one or more frames, and the audio frame played at the target time may include one or more frames.

Specifically, the server can obtain the text displayed at the target time in the target video as the target text, for example, at least one of subtitles, bullet screens or comments displayed at the target time, as the target text. The server can acquire at least one of the video frame displayed at the target time or the audio frame played at the target time in the target video, as the video-related data.

In this embodiment, the text corresponding to the target time in the target video is acquired to obtain the target text, the video-related data corresponding to the target time in the target video is acquired, and the video-related data is taken as the text-associated data associated with the target text. Since the video-related data includes at least one of a video frame or an audio frame, text data and image data or audio data other than the text data are acquired. Therefore, the video can be recognized on the basis of the text data in combination with the image data or the audio data, thereby helping to improve the accuracy of recognition.

In some embodiments, the adjusted text features include first adjusted text features obtained by adjustment according to the video frame. Performing recognition based on the adjusted text features to obtain the content recognition result corresponding to the target content includes: fusing the first adjusted text features and the text-extracted features to obtain fused text features; performing recognition based on the fused text features to obtain the content recognition result corresponding to the target content.

Specifically, the server can acquire a video frame from the text-associated data, perform feature extraction on the acquired video frame to obtain target image features, obtain the first adjusted text features based on the target image features, acquire an audio frame from the text-associated data, perform feature extraction on the acquired audio frame to obtain target audio features, and obtain the second adjusted text feature based on the target audio features.

In some embodiments, the server can perform weighted calculation on the first adjusted text features and the text-extracted features, and take the result of weighted calculation as the fused text features. For example, the server can perform product operation on the first text weights and the text-extracted features to obtain first product values, perform product operation on the first feature weights and the first adjusted text features to obtain second product values, perform product operation on the second text weights and the text-extracted features to obtain third product values, and take the result of adding the first product values, the second product values, and the third product values as the fused text features.

In this embodiment, the first adjusted text features and the text-extracted features are fused to obtain the fused text features, so that the fused text features are obtained based on the first adjusted text features and the text-extracted features, thereby improving the feature richness of the fused text features. Therefore, when recognition is performed based on the fused text features, the accuracy of recognition can be improved.

In some embodiments, the adjusted text features further include second adjusted text features obtained by adjustment according to the audio frame. Fusing the first adjusted text features and the text-extracted features to obtain the fused text features includes: fusing the first adjusted text features, the second adjusted text features, and the text-extracted features to obtain the fused text features.

Specifically, the server can acquire an audio frame from the text-associated data, perform feature extraction on the acquired audio frame to obtain target audio features, and obtain the second adjusted text feature based on the target audio features.

In some embodiments, the server can perform weighted calculation on the first adjusted text features, the second adjusted text features, and the text-extracted features, and take the result of weighted calculation as the fused text features. For example, the server can perform product operation on the first text weights and the text-extracted features to obtain first product values, perform product operation on the first feature weights and the first adjusted text features to obtain second product values, perform product operation on the second text weights and the text-extracted features to obtain third product values, perform product operation on the second feature weights and the second adjusted text features to obtain fourth product values, and take the result of adding the first product values, the second product values, the third product values, and the fourth product values as the fused text features.

In this embodiment, the first adjusted text features, the second adjusted text features, and the text-extracted features are fused to obtain the fused text features, so that the fused text features are obtained based on the first adjusted text features, the second adjusted text features, and the text-extracted features, thereby improving the feature richness of the fused text features. Therefore, when recognition is performed based on the fused text features, the accuracy of recognition can be improved.

In some embodiments, adjusting the text-extracted features based on the feature association degrees to obtain the adjusted text features includes: obtaining feature attention intensities corresponding to the text-extracted features based on the feature association degrees, the feature association degrees being positively correlated with the feature attention intensities; and adjusting the text-extracted features based on the feature attention intensities to obtain the adjusted text features.

In this embodiment, since the feature association degrees are positively correlated with the feature attention intensities, adjusting the text-extracted features based on the feature attention intensities implements adaptive adjustment of text features according to the association degree between the text-associated data and the target text. Therefore, when recognition is performed based on the adjusted text features, the recognition result is affected by the text-associated data. The greater the association degree between the target text and the text-associated data is, the greater the influence of the text-associated data on the recognition result is, so that more attention is paid to information with a greater association degree during content recognition, thereby improving the accuracy of content recognition.

In some embodiments, adjusting the text-extracted features based on the feature attention intensities to obtain the adjusted text features includes: multiplying the feature attention intensities by feature values of the text-extracted features to obtain feature value products; arranging the feature value products according to positions of the feature values in the text-extracted features, and taking feature value sequences obtained by arrangement as the adjusted text features.

A feature value product refers to the result obtained by multiplying a text feature value by a feature attention intensity. The feature value sequence is obtained by arranging the feature value products obtained by calculating the text feature values according to the positions of the text feature values in the text-extracted features. That is, the positions of the text feature values in the text-extracted features are the same as the positions of the feature value products calculated from the text feature values in the feature value sequence.

In this embodiments, the feature attention intensities are multiplied by the feature values of the text-extracted features to obtain the feature value products. Therefore, the feature value products can reflect the attention degrees of the text-associated data to the text feature values. The feature value products are arranged according to the positions of the feature values in the text-extracted features, and the feature value sequences obtained by arrangement are taken as the adjusted text features. Therefore, the adjusted text features can reflect the attention degrees of the text-associated data to the text-extracted features.

In some embodiments, the text-extracted features are features corresponding to segmented words in the target text. The adjusted text features form a feature sequence according to order of the segmented words in the target text. Performing recognition based on the adjusted text features to obtain the content recognition result corresponding to the target content includes: obtaining, based on the feature sequence, positional relationships of the segmented words relative to a named entity; and acquiring a target named entity from the target text based on the positional relationships, and taking the target named entity as the content recognition result corresponding to the target content.

The feature sequence is a sequence obtained by ranking, according to the order of target segmented words in the target text, the adjusted text features corresponding to the target segmented words. The target segmented words refer to segmented words in the target text. A named entity refers to an entity identified by a name, and may include at least one of a person's name, a place name or an institution's name. The named entity may be, for example, "Zhang San", "region A" or "institution B".

The positional relationship relative to the named entity may include at least one of a named entity position or a non-named entity position. The named entity position refers to the position where the named entity is located, and may include at least one of the beginning position of the named entity, the ending position of the named entity, or the middle positions of the named entity. The middle positions of the named entity may include all positions between the beginning position and the ending position of the named entity. The non-named entity position refers to the position of a segmented word outside the named entity.

Specifically, the server can determine the positional relationships of the target segmented words relative to the named entity based on the feature sequence to obtain the positional relationships respectively corresponding to the target segmented words, and acquire, from among the positional relationships, corresponding target segmented words of which the positional relationships belong to the positional relationships of the named entity position as entity segmented words, and obtains the target named entity based on the entity segmented words.

In some embodiments, the trained content recognition model may include an entity recognition network. The server can input the feature sequence into the entity recognition network, and use the entity recognition network to perform position recognition on the adjusted text features in the feature sequence. For example, the entity recognition network can determine, based on the adjusted text features, a probability that the target segmented words corresponding to the adjusted text features are at the named entity position, to obtain a named entity probability, and determine the positional relationship of a target segmented word of which the named entity probability is greater than a named entity probability threshold as the named entity position. The named entity probability threshold can be set as needed. The entity recognition network can also determine, based on the adjusted text features, a probability that the target segmented words corresponding to the adjusted text features are at the beginning position of the named entity, to obtain a beginning probability, and determine the positional relationship of a target segmented word of which the beginning probability is greater than a beginning probability threshold as the beginning position of the named entity. The beginning probability threshold can be set as needed. The entity recognition network can also determine, based on the adjusted text features, a probability that the target segmented words corresponding to the adjusted text features are at the ending position of the named entity, to obtain an ending probability, and determine the positional relationship of a target segmented word of which the ending probability is greater than an ending probability threshold as the ending position of the named entity. The ending probability threshold can be set as needed.

In this embodiment, the positional relationships of the segmented words relative to the named entity are obtained based on the feature sequence; the target named entity is obtained from the target text based on the positional relationships; and the target named entity is taken as the content recognition result corresponding to the target content. Therefore, content recognition can be performed based on the feature sequence formed by the adjusted text features, thereby improving the accuracy of content recognition.

In some embodiments, acquiring the target named entity from the target text based on the positional relationships includes: acquiring a segmented word of which the positional relationship is the beginning position of the named entity as a named entity beginning word; taking a segmented word, in backward segmented words corresponding to the named entity beginning word, of which the positional relationship is inside the named entity as a named entity constituent word; and combining the named entity beginning word and the named entity constituent word to obtain the target named entity.

The named entity beginning word refers to a segmented word at the beginning position of the named entity. The backward segmented words corresponding to the named entity beginning word refer to segmented words in the target text that are ranked behind the named entity beginning word. The named entity constituent word refers to a segmented word in the target text located inside the named entity. The inside of the named entity includes the ending position of the named entity and the middle position of the named entity. The ending position of the named entity and the middle position of the named entity may be the same position. For example, when the segmented words are single words, assuming that the target text is "Zhang San likes flowers", the named entity is "Zhang San", which contains two words. Since "Zhang" is at the beginning position of the named entity, the named entity beginning word is "Zhang", and the backward segmented words corresponding to the named entity beginning word include "San", "likes" and "flowers". Since "San" is located inside the named entity, the named entity constituent word is "San". The target named entity is an entity included in the target text, and is obtained by combining the named entity beginning word and the corresponding named entity constituent word. The target text may include one or more target named entities, and multiple refers to at least two. For example, assuming that the target text is "Zhang San likes Li Si", the target text includes two target named entities, which are "Zhang San" and "Li Si", respectively.

Specifically, the server can acquire, from the target text and based on the positional relationships corresponding to the target segmented words, the segmented word of which the positional relationship is the beginning position of the named entity as the named entity beginning word, and sequentially acquire, according to the arrangement order from front to back, a backward segmented word from the backward segmented words corresponding to the named entity beginning word as a current backward segmented word. When the positional relationship of the current backward segmented word is inside the named entity, the server can take the current backward segmented word as the named entity constituent word corresponding to the named entity beginning word. When the positional relationship of the current backward segmented word is outside the named entity, the server can stop acquiring a backward segmented word from the backward segmented words corresponding to the named entity beginning word, and rank the named entity beginning word and the named entity constituent word from front to back according to the positions of the named entity beginning word and the named entity constituent word in the target text to obtain the target named entity. For example, since the position of "Zhang" is before "San", "Zhang San" is obtained by ranking, that is, "Zhang San" is the target named entity.

In this embodiment, the segmented word of which the positional relationship is the beginning position of the named entity is acquired as the named entity beginning word; the segmented word, in the backward segmented words corresponding to the named entity beginning word, of which the positional relationship is inside the named entity is taken as the named entity constituent word; and the named entity beginning word and the named entity constituent word are combined to obtain the target named entity. Therefore, entity recognition can be performed based on the feature sequence formed by adjusted text features, thereby improving the accuracy of entity recognition.

In some embodiments, obtaining, based on the feature sequence, the positional relationships of the segmented words relative to the named entity include: obtaining, based on the feature sequence, the positional relationships of the segmented words relative to the named entity and entity types corresponding to the segmented words. Taking the segmented word, in the backward segmented words corresponding to the named entity beginning word, of which the positional relationship is inside the named entity as the named entity constituent word includes: taking a segmented word, in the backward segmented words corresponding to the named entity beginning word, of which the positional relationship is inside the named entity and the entity type is the same as a type of the named entity beginning word as the named entity constituent word.

Entity type refers to the type of a named entity, including at least one of a person's name, an institution's name, or a place name. The named entity beginning word and the named entity constituent word can have corresponding entity types, respectively.

Specifically, the server can recognize the entity types of the features in the feature sequence, determine the entity types corresponding to the features in the feature sequence, and sequentially acquire, according to the arrangement order from front to back, a backward segmented word from the backward segmented words corresponding to the named entity beginning word as the current backward segmented word. When the positional relationship of the current backward segmented word is inside the named entity and the entity type is the same as the entity type of the named entity beginning word, the server can take the current backward segmented word as the named entity constituent word corresponding to the named entity beginning word. When the positional relationship of the current backward segmented word is outside the named entity or the entity type is different from the entity type of the named entity beginning word, the server can stop acquiring a backward segmented word from the backward segmented words corresponding to the named entity beginning word.

In some embodiments, the text-extracted features are features corresponding to the target segmented words in the target text. The fused text features corresponding to the target segmented words form a fused feature sequence according to the order of the target segmented words in the target text. Performing recognition based on the adjusted text features to obtain the content recognition result corresponding to the target content includes: obtaining, based on the fused feature sequence, positional relationships of the segmented words relative to the named entity; and acquiring a target named entity from the target text based on the positional relationships, and taking the target named entity as the content recognition result corresponding to the target content.

Figure 6:
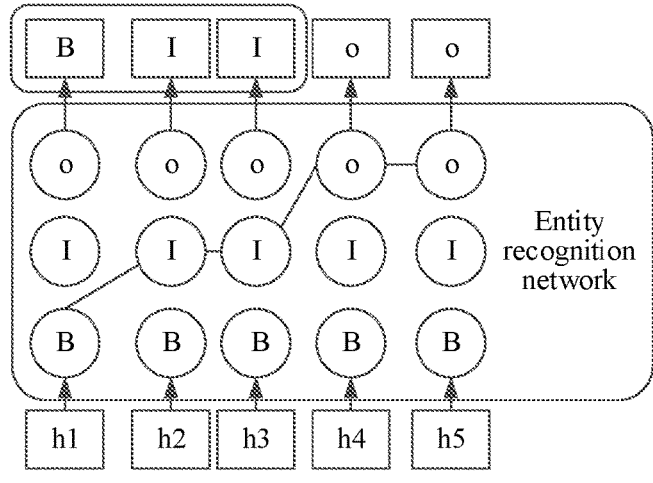
FIG. 6 is a schematic diagram of entity recognition using an entity recognition network according to some embodiments.

In some embodiments, the fused feature sequence can be inputted into the entity recognition network, and the entity recognition network performs entity word recognition on the fused text features in the fused feature sequence. The entity recognition network may be, for example, the CRF network in FIG. 6. In FIG. 6, the target text is "Zhang Xiaohua loves to smile", and the fused feature sequence is [h1, h2, h3, h4, h5], where h1 is a fused text feature corresponding to the segmented word "Zhang", h2 is a fused text feature corresponding to the segmented word "Xiaohua", h3 is a fused text feature corresponding to the segmented word "loves", h4 is a fused text feature corresponding to the segmented word "to", and h5 is a fused text feature corresponding to the segmented word "smile". The fused feature sequence is inputted into the CRF network for entity recognition. The CRF network can score the segmented words in the target text based on the features in the fused feature sequence to obtain scores corresponding to the segmented words, and perform normalization processing on the scores of the segmented words by using softmax, to obtain a probability distribution corresponding to the segmented words. By using the CRF network to recognize the position of the person's name in "Zhang Xiaohua loves to smile", the CRF network can use a "BIO" labeling method to label the target segmented words in "Zhang Xiaohua loves to smile" to obtain labels corresponding to the fused text features, where B is the abbreviation of begin, indicating the beginning of the entity word, I is the abbreviation of inside, indicating the inside of the entity word, and O is the abbreviation of outside, indicating the outside of the entity word. As shown in the figure, the label of "Zhang Xiaohua loves to smile" is "B-PER, I-PER, I-PER, O, O", where "PER" indicates that the type of the entity word is a person's name. From "B-PER, I-PER, I-PER, O, O", it can be determined that "Zhang Xiaohua" in "Zhang Xiaohua loves to smile" is the target named entity.

In this embodiment, the positional relationships of the segmented words relative to the named entity and the entity types corresponding to the segmented words are obtained based on the feature sequence, and the segmented word, in the backward segmented words corresponding to the named entity beginning word, of which the positional relationship is inside the named entity and the entity type is the same as the type of the named entity beginning word is taken as the named entity constituent word, thereby improving the accuracy of entity recognition.

In some embodiments, determining the feature association degrees between the associated extracted features and the text-extracted features includes: performing product operation on associated feature values in the associated extracted features and text feature values in the text-extracted features at corresponding positions to obtain product operation values; and collecting statistics on the product operation values to obtain the feature association degrees between the associated extracted features and the text-extracted features.

Specifically, the associated extracted features and the text-extracted features may be vectors or matrices of the same dimension. The server can acquire the associated feature values at a target ranking from the associated extracted features as first target feature values, and acquire the text feature values at a target position from the text-extracted features as second target feature values. The second target feature values and the second target feature values have a positional correspondence. The server can perform product operation on the first target feature values and the second target feature values to obtain product operation values obtained by calculating the text feature values and the associated feature values at the target position. The target position may be any position in the associated extracted features or the text-extracted features. For example, when the associated extracted features are vectors, the target position may be any ranking position, such as the first position.

In some embodiments, the server can collect statistics on the product operation values to obtain product statistics values, perform normalization processing on the product statistics values, and use the results of normalization processing as the feature association degrees. The server can take the feature association degrees as the feature attention intensities corresponding to the text-extracted features.

In this embodiment, product operation is performed on the associated feature values in the associated extracted features and the text feature values in the text-extracted features at the corresponding positions to obtain the product operation values, and statistics are collected on the product operation values to obtain the feature association degrees between the associated extracted features and the text-extracted features. Therefore, the feature association degrees can accurately reflect the association relationship between the text-associated data and the target text, so that when the text-extracted features are adjusted based on the feature association degrees, the accuracy of adjustment can be improved.

In some embodiments, a content recognition method is provided, which includes the following steps:

In step A, a target video to be recognized is determined, and, from the target video, a target text, and target image data and target audio data associated with the target text are acquired.

In step B, feature extraction on the target text is performed to obtain text-extracted features, feature extraction on the target image data is also performed to obtain target image features, and feature extraction on the target audio data is also performed to obtain target audio features.

Figure 7:
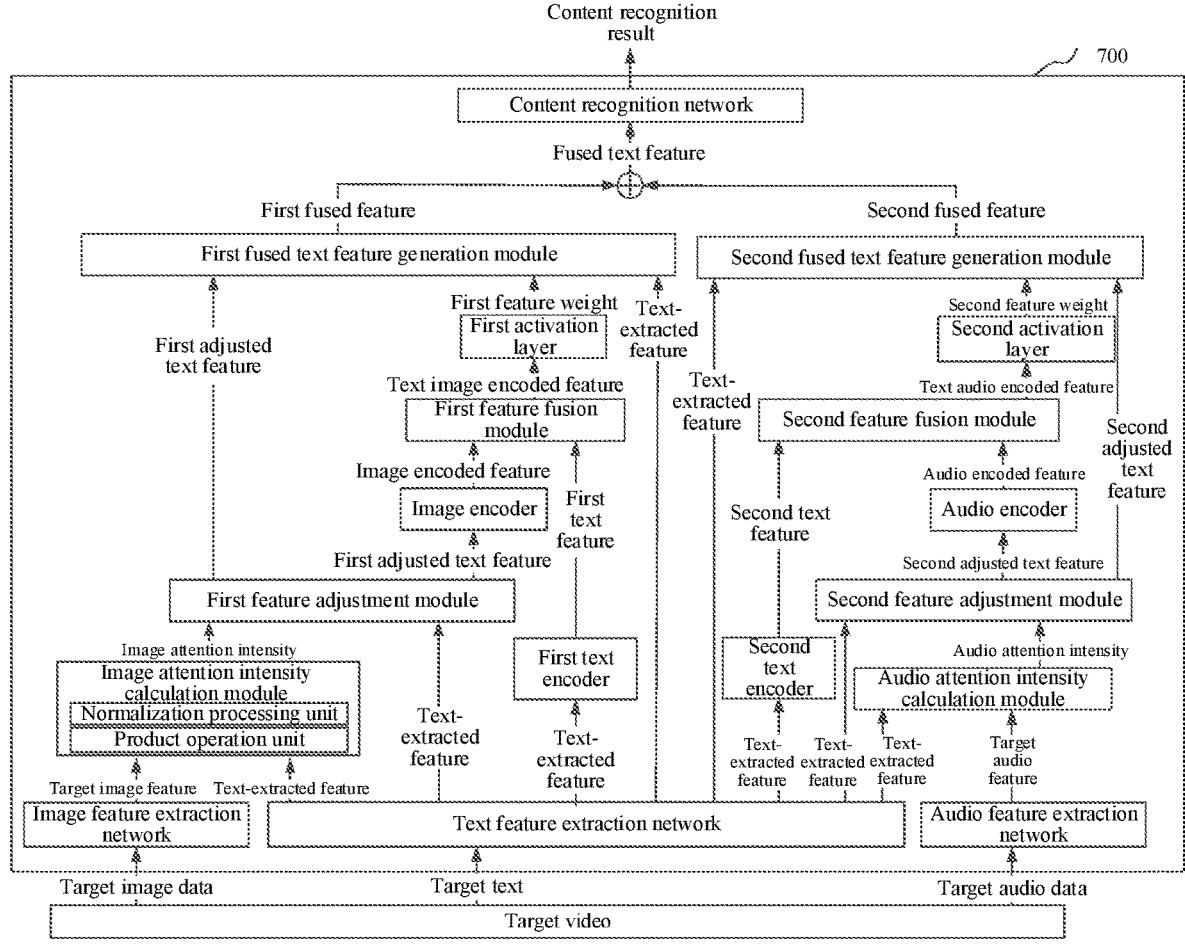
FIG. 7 is a frame diagram of a content recognition network according to some embodiments.

Specifically, as shown in FIG. 7, FIG. 7 shows a trained entity recognition network 700. The server can use a text feature extraction network in a trained entity recognition model to perform feature extraction on a target text to obtain text-extracted features. Similarly, the server can use an image feature extraction network to perform feature extraction on the target image data to obtain target image features, and use an audio feature extraction network to perform feature extraction on the target audio data to obtain target audio features.

In step C, association calculation is performed on the target image features and the text-extracted features to obtain image association degrees, the image association degrees are taken as image attention intensities, association calculation on the target audio features and the text-extracted features is performed to obtain audio association degrees, and the audio association degrees are taken as audio attention intensities.

Specifically, as shown in FIG. 7, an image attention intensity calculation module can be employed to perform association calculation the target image features and text-extracted feature to obtain the image attention intensities, and an audio attention intensity calculation module can be employed to perform association calculation on the target audio feature sand the text-extracted features to obtain the audio attention intensities. The image attention intensity calculation module includes a product operation unit and a normalization processing unit. The image attention intensity calculation module can perform product operation on the target image features and the text-extracted features through the product operation unit, and input the operation result into the normalization processing unit for normalization processing to obtain the image attention intensities. For a process of obtaining the audio attention intensities calculated by the audio attention intensity calculation module, reference can be made to the image attention intensity calculation module.

In step D, the text-extracted features are adjusted based on the image attention intensities to obtain first adjusted text features, and the text-extracted features are adjusted based on the audio attention intensities to obtain second adjusted text features.

Specifically, as shown in FIG. 7, the image attention intensities and the text-extracted features can be inputted into a first feature adjustment module. The first feature adjustment module can multiply the image attention intensities by feature values of the text-extracted features, and arrange the values obtained by multiplication according to the positions of the feature values in the text-extracted features to obtain the first adjusted text features. Similarly, the second adjusted text features can be obtained using a second feature adjustment module.

In step E, first feature weights corresponding to the first adjusted text features are determined, and second feature weights corresponding to the second adjusted text features are also determined.

Specifically, as shown in FIG. 7, the server can input first adjusted text features into an image encoder for encoding to obtain image encoded features, input the text-extracted features into a first text encoder for encoding to obtain first text features, and input the first text features and the image encoded features into a first feature fusion module to obtain text image encoded features. The server can input second adjusted text features into an audio encoder for encoding to obtain audio encoded features, input the text-extracted features into a second text encoder for encoding to obtain second text features, and input the second text features and the audio encoded features into a second feature fusion module to obtain text audio encoded features, input the text image encoded features into a first activation layer for activation to obtain first feature weights corresponding to the first adjusted text features, and input the text audio encoded features into a second activation layer for activation to obtain second feature weights corresponding to the second adjusted text features.

In step F, the first adjusted text features and the text-extracted features are fused based on the first feature weights to obtain first fused features, the second adjusted text features and the text-extracted features are fused based on the second feature weights to obtain second fused features, statistical operation is performed on the first fused features and the second fused features, and the result of statistical operation is taken as fused text features.

Specifically, as shown in FIG. 7, the server can input the first feature weights, the first adjusted text features and the text-extracted features into a first fused text feature generation module to obtain the first fused features, and input the second feature weights, the second adjusted text features and the text-extracted features into a second fused text feature generation module to obtain the second fused features.

In step G, named entity recognition is performed on the fused text features to obtain a target named entity corresponding to the target content, and the target named entity is taken as a content recognition result corresponding to the target content.

Figure 8:
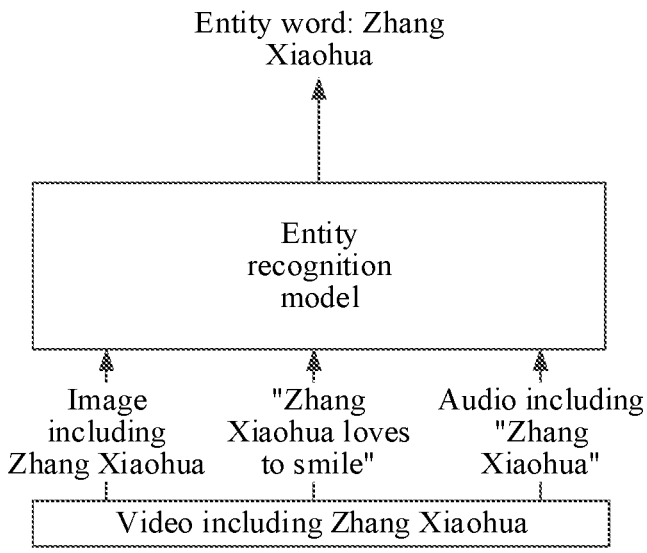
FIG. 8 is a schematic diagram of entity recognition using an entity recognition model according to some embodiments.

For example, as shown in FIG. 8, the target video is a video of "Zhang Xiaohua". The target text is subtitle "Zhang Xiaohua loves to smile" in the video of "Zhang Xiaohua". The target image data is an image temporally associated with the subtitle "Zhang Xiaohua loves to smile" in the video of "Zhang Xiaohua", i.e., an image including "Zhang Xiaohua". The target audio data is an audio temporally associated with the subtitle "Zhang Xiaohua loves to smile" in the video of "Zhang Xiaohua", i.e., an audio including "Zhang Xiaohua". By inputting the subtitle "Zhang Xiaohua loves to smile", the image including "Zhang Xiaohua", and the audio including "Zhang Xiaohua" into the entity recognition model, the entity word "Zhang Xiaohua" can be determined.

According to the content recognition method, during entity recognition, in addition to text information in the video, such as the title, subtitle or description information in the video, audio features and image features of the video are also used. Moreover, by fusing multi-modal features, video information can be more accurately and effectively extracted, thereby enhancing the recognition effect of entity word recognition, for example, improving the accuracy and efficiency of entity word recognition. An accuracy rate and a recall rate on a test data set can be increased. A modality may be a data type, for example, a text, an audio and an image are each a modality. Multi-modality refers to at least two modalities. Modal features may be, for example, any of text features, audio features, or image features. The multi-modal features include features of at least two modalities.

The entity word recognition model (i.e., the entity recognition model) provided in this disclosure can more effectively extract video information.

This disclosure further provides an application scenario. The content recognition method is applied in the application scenario, so that entity recognition can be performed on the text in the video. Specifically, the application of the content recognition method in this application scenario is as follows:

receiving a video tag generation request for a target video;

in response to the video tag generation request, using the content recognition method provided by this disclosure to perform entity word recognition on the target video to obtain recognized entity words; and taking the recognized entity words as video tags corresponding to the target video.

The application of the content recognition method provided by this disclosure to video recognition can save time for acquiring video information and improve the efficiency of understanding the video information.

This disclosure further provides an application scenario. The content recognition method is applied in the application scenario, so that entity recognition can be performed on the text in the video. Specifically, the application of the content recognition method in this application scenario is as follows:

receiving a video recommendation request corresponding to a target user; acquiring a candidate video; using the content recognition method provided by this disclosure to perform entity word recognition on the candidate video; taking the recognized entity words as video tags corresponding to the candidate video; acquiring user information corresponding to the target user; and when it is determined that the video tags match the user information, for example, the video tags match a user portrait of the user, pushing the candidate video to a terminal corresponding to the target user.

The application of the content recognition method provided by this disclosure in video recommendation can provide high-quality features for a video recommendation algorithm and optimize the video recommendation effect.

Although the steps in the flowcharts of the embodiments are displayed sequentially according to instructions of arrows, these steps are not necessarily performed sequentially according to a sequence instructed by the arrows. Unless clearly specified in this specification, there is no strict sequence limitation on the execution of the steps, and the steps may be performed in another sequence. Moreover, at least some of the steps in each embodiment may include a plurality of steps or a plurality of stages. The steps or stages are not necessarily performed at the same moment but may be performed at different moments. The steps or stages are not necessarily performed sequentially, but may be performed in turn or alternately with another step or at least some of steps or stages of the another step.

Figure 9:
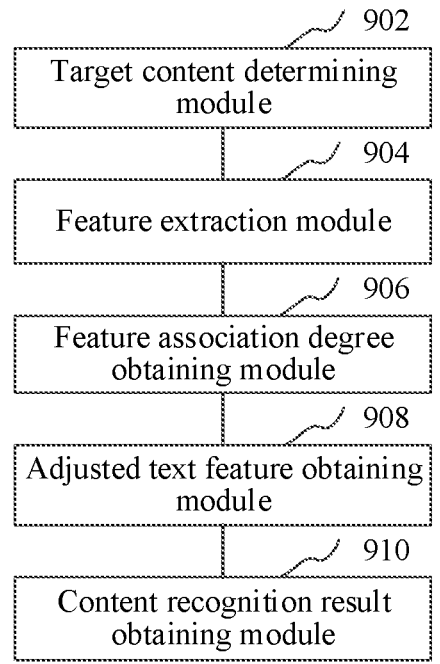
FIG. 9 is a structural block diagram of a content recognition apparatus according to some embodiments.

In some embodiments, as shown in FIG. 9, a content recognition apparatus is provided. The apparatus can use software modules or hardware modules, or a combination of the two to become a part of a computer device. The apparatus specifically includes: a target content determining module 902, a feature extraction module 904, a feature association degree obtaining module 906, an adjusted text feature obtaining module 908, and a content recognition result obtaining module 910. The target content determining module 902 is configured to determine target content to be recognized, and acquire, from the target content, a target text and text-associated data associated with the target text. The feature extraction module 904 is configured to: perform feature extraction on the target text to obtain text-extracted features; and perform feature extraction on the text-associated data to obtain associated extracted features. The feature association degree obtaining module 906 is configured to determine feature association degrees between the associated extracted features and the text-extracted features. The feature association degrees are used for representing an association degree between the target text and the text-associated data. The adjusted text feature obtaining module 908 is configured to adjust the text-extracted features based on the feature association degrees to obtain adjusted text features. The content recognition result obtaining module 910 is configured to perform recognition based on the adjusted text features to obtain a content recognition result corresponding to the target content.

In the content recognition apparatus, target content to be recognized is determined; a target text and text-associated data associated with the target text are acquired from the target content; feature extraction is performed on the target text to obtain text-extracted features, and feature extraction is performed on the text-associated data to obtain associated extracted features; feature association degrees between the associated extracted features and the text-extracted features are determined; the text-extracted features are adjusted based on the feature association degrees to obtain adjusted text features; and recognition is performed based on the adjusted text features to obtain a content recognition result corresponding to the target content. Since the feature association degrees reflect an association degree between the target text and the text-associated data, the greater the feature association degrees are, the greater the association degree between the target text and the text-associated data is, and the smaller the feature association degrees are, the smaller the association degree between the target text and the text-associated data is. Therefore, when performing recognition based on the adjusted text features, the greater the association degree between the target text and the text-associated data is, the greater the influence of the text-associated data on the recognition result is, and the smaller the association degree between the target text and the text-associated data is, the smaller the influence of the text-associated data on the recognition result is. Therefore, features for recognition can be adaptively adjusted according to the relationship between text-associated data and the target text, thereby improving the accuracy of the features for recognition, and improving the accuracy of content recognition.

In some embodiments, the content recognition result obtaining module 910 includes: a first fused text feature obtaining unit, configured to fuse the adjusted text features and the text-extracted features to obtain fused text features; and a first content recognition result obtaining unit, configured to perform recognition based on the fused text features to obtain the content recognition result corresponding to the target content.

In this embodiment, fusing the adjusted text features and the text-extracted features to obtain the fused text features, and performing recognition based on the fused text features to obtain the content recognition result corresponding to the target content can improve the accuracy of content recognition.

In some embodiments, the first fused text feature obtaining unit is further configured to: encode the text-extracted features to obtain first encoded features, and encode the adjusted text features to obtain second encoded features; fuse the first encoded features and the second encoded features to obtain fused encoded features; obtain adjusted-feature weights corresponding to the adjusted text features based on the fused encoded features; and fuse the adjusted text features and the text-extracted features based on the adjusted-feature weights to obtain the fused text features.

In this embodiment, the text-extracted features are encoded to obtain first encoded features, and the adjusted text features are encoded to obtain second encoded features; the first encoded features and the second encoded features are fused to obtain the fused encoded features; the adjusted-feature weights corresponding to the adjusted text features are obtained based on the fused encoded features; and the adjusted text features and the text-extracted features are fused based on the adjusted-feature weights to obtain the fused text features. Therefore, the fused text features can reflect both the text-extracted features and the adjusted text features, thereby improving the expression ability of the fused text features. When recognition is performed based on the adjusted text features, the accuracy of recognition can be improved.

In some embodiments, the first encoded features are obtained by encoding through a first encoder in a trained content recognition model, and the second encoded features are obtained by encoding through a second encoder in the content recognition model. The first fused text feature obtaining unit is further configured to input the fused encoded features into a target activation layer in the content recognition model for activation processing to obtain activation values, and take the activation values as the adjusted-feature weights corresponding to the adjusted text features. The target activation layer is a shared activation layer of the first encoder and the second encoder.

In this embodiment, the fused encoded features are inputted into the target activation layer in the content recognition model for activation processing to obtain the target activation values, and the target activation values are taken as the adjusted-feature weights corresponding to the adjusted text features, so that the adjusted-feature weights are normalized values, and the rationality of the adjusted-feature weights is improved.

In some embodiments, the first fused text feature obtaining unit is further configured to: obtain text feature weights corresponding to the text-extracted features based on the adjusted-feature weights; perform product operation on the adjusted-feature weights and the adjusted text features to obtain calculated adjusted text features; perform product operation on the text feature weights and the text-extracted features to obtain calculated text-extracted features; add the calculated adjusted text features and the calculated text-extracted features to obtain the fused text features.

In this embodiment, product operation is performed on the adjusted-feature weights and the adjusted text features to obtain the calculated adjusted text features, and product operation is performed on the text feature weights and the text-extracted features to obtain the calculated text-extracted features; and the calculated adjusted text features and the calculated text-extracted features are added to obtain the fused text features. Since the text feature weights are obtained based on the adjusted-feature weights, the accuracy of the text feature weights are improved, thereby improving the accuracy of the fused text features.

In some embodiments, the target content is a target video. The target content determining module 902 includes: a target text obtaining unit, configured to acquire a text corresponding to a target time in the target video to obtain the target text; and a text-associated data obtaining unit, configured to acquire video-related data corresponding to the target time in the target video, and take the video-related data as the text-associated data associated with the target text, the video-related data including at least one of a video frame or an audio frame.

In this embodiment, the text corresponding to the target time in the target video is acquired to obtain the target text, the video-related data corresponding to the target time in the target video is acquired, and the video-related data is taken as the text-associated data associated with the target text. Since the video-related data includes at least one of a video frame or an audio frame, text data and image data or audio data other than the text data are acquired. Therefore, the video can be recognized on the basis of the text data in combination with the image data or the audio data, thereby helping to improve the accuracy of recognition.

In some embodiments, the adjusted text features include first adjusted text features obtained by adjustment according to the video frame. The content recognition result obtaining module 910 includes: a second fused text feature obtaining unit, configured to fuse the first adjusted text features and the text-extracted features to obtain fused text features; and a second content recognition result obtaining unit, configured to perform recognition based on the fused text features to obtain the content recognition result corresponding to the target content.

In this embodiment, the first adjusted text features, the second adjusted text features, and the text-extracted features are fused to obtain the fused text features, so that the fused text features are obtained based on the first adjusted text features, the second adjusted text features, and the text-extracted features, thereby improving the feature richness of the fused text features. Therefore, when recognition is performed based on the fused text features, the accuracy of recognition can be improved.

In some embodiments, the adjusted text features further include second adjusted text features obtained by adjustment according to the audio frame. The second fused text feature obtaining unit is further configured to: fuse the first adjusted text features, the second adjusted text features, and the text-extracted features to obtain the fused text features.

In this embodiment, the first adjusted text features, the second adjusted text features, and the text-extracted features are fused to obtain the fused text features, so that the fused text features are obtained based on the first adjusted text features, the second adjusted text features, and the text-extracted features, thereby improving the feature richness of the fused text features. Therefore, when recognition is performed based on the fused text features, the accuracy of recognition can be improved.

In some embodiments, adjusting the text-extracted features based on the feature association degrees to obtain the adjusted text features includes: obtaining feature attention intensities corresponding to the text-extracted features based on the feature association degrees, the feature association degrees being positively correlated with the feature attention intensities; and adjusting the text-extracted features based on the feature attention intensities to obtain the adjusted text features.

In this embodiment, since the feature association degrees are positively correlated with the feature attention intensities, the greater the association degree between the target text and the text-associated data is, the greater the feature attention intensities are, and the greater the degrees of adjustment to the text-extracted features are. The smaller the association degree between the target text and the text-associated data is, the smaller the feature attention intensities are, and the smaller the degrees of adjustment to the text-extracted features are. Therefore, adjusting the text-extracted features based on the feature attention intensities implements adaptive adjustment of text features according to the association degree between the text-associated data and the target text. Therefore, when recognition is performed based on the adjusted text features, the recognition result is affected by the text-associated data. The greater the association degree between the target text and the text-associated data is, the greater the influence of the text-associated data on the recognition result is, so that more attention is paid to information with a greater association degree during content recognition, thereby improving the accuracy of content recognition.

In some embodiments, the adjusted text feature obtaining module 908 includes: a feature value product obtaining unit, configured to multiply the feature attention intensities by feature values of the text-extracted features to obtain feature value products; and an adjusted text feature obtaining unit, configured to arrange the feature value products according to positions of the feature values in the text-extracted features, and take feature value sequences obtained by arrangement as the adjusted text features.

In this embodiments, the feature attention intensities are multiplied by the feature values of the text-extracted features to obtain the feature value products. Therefore, the feature value products can reflect the attention degrees of the text-associated data to the text feature values. The feature value products are ranked according to the ranking of the feature values in the text-extracted features, and the feature value sequences obtained by ranking are taken as the adjusted text features. Therefore, the adjusted text features can reflect the attention degrees of the text-associated data to the text-extracted features.

In some embodiments, the text-extracted features are features corresponding to segmented words in the target text. The adjusted text features form a feature sequence according to order of the segmented words in the target text. The content recognition result obtaining module 910 includes: a positional relationship obtaining unit, configured to obtain, based on the feature sequence, positional relationships of the segmented words relative to a named entity; and a third content recognition result obtaining unit, configured to acquire a target named entity from the target text based on the positional relationships, and take the target named entity as the content recognition result corresponding to the target content.

In this embodiment, the positional relationships of the segmented words relative to the named entity are obtained based on the feature sequence; the target named entity is obtained from the target text based on the positional relationships; and the target named entity is taken as the content recognition result corresponding to the target content. Therefore, content recognition can be performed based on the feature sequence formed by the adjusted text features, thereby improving the accuracy of content recognition.

In some embodiments, the third content recognition result obtaining unit is further configured to: acquire a segmented word of which the positional relationship is a beginning position of the named entity as a named entity beginning word; take a segmented word, in backward segmented words corresponding to the named entity beginning word, of which the positional relationship is inside the named entity as a named entity constituent word; and combine the named entity beginning word and the named entity constituent word to obtain the target named entity.

In this embodiment, the segmented word of which the positional relationship is the beginning position of the named entity is acquired as the named entity beginning word; the segmented word, in the backward segmented words corresponding to the named entity beginning word, of which the positional relationship is inside the named entity is taken as the named entity constituent word; and the named entity beginning word and the named entity constituent word are combined to obtain the target named entity. Therefore, entity recognition can be performed based on the feature sequence formed by adjusted text features, thereby improving the accuracy of entity recognition.

In some embodiments, the positional relationship obtaining unit is further configured to obtain, based on the feature sequence, the positional relationships of the segmented words relative to the named entity and entity types corresponding to the segmented words. The third content recognition result obtaining unit is further configured to take a segmented word, in the backward segmented words corresponding to the named entity beginning word, of which the positional relationship is inside the named entity and the entity type is the same as a type of the named entity beginning word as the named entity constituent word.

In this embodiment, the positional relationships of the segmented words relative to the named entity and the entity types corresponding to the segmented words are obtained based on the feature sequence, and the segmented word, in the backward segmented words corresponding to the named entity beginning word, of which the positional relationship is inside the named entity and the entity type is the same as the type of the named entity beginning word is taken as the named entity constituent word, thereby improving the accuracy of entity recognition.

In some embodiments, the feature association degree obtaining module 906 includes: a product operation value obtaining unit, configured to perform product operation on associated feature values in the associated extracted features and text feature values in the text-extracted features at corresponding positions to obtain product operation values; and a feature attention intensity obtaining unit, configured to collect statistics on the product operation values to obtain the feature association degrees between the associated extracted features and the text-extracted features.

In this embodiment, product operation is performed on the associated feature values in the associated extracted features and the text feature values in the text-extracted features at the corresponding positions to obtain the product operation values, and statistics are collected on the product operation values to obtain the feature association degrees between the associated extracted features and the text-extracted features. Therefore, the feature association degrees can accurately reflect the association degree between the text-associated data and the target text, so that when the text-extracted features are adjusted based on the feature association degrees, the accuracy of adjustment can be improved.

For specific definition of the content recognition apparatus, refer to the definition of the foregoing content recognition method. Some or all of modules of the content recognition apparatus can be implemented by software, hardware, and a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a server, and an internal structure diagram thereof may be shown in FIG. 10. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store content recognition data. The network interface of the computer device is configured to communicate with an external terminal through a network connection. When executed by a processor, the computer-readable instruction implements a content recognition method.

In some embodiments, a computer device is provided. The computer device may be a terminal, and an internal structure diagram thereof may be shown in FIG. 11. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The communications interface of the computer device is configured to communicate with an external terminal in a wired or wireless manner. The wireless communication may be implemented by WIFI, an operator network, NFC (Near Field Communication), or other technologies. When executed by a processor, the computer-readable instruction implements a content recognition method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 10:
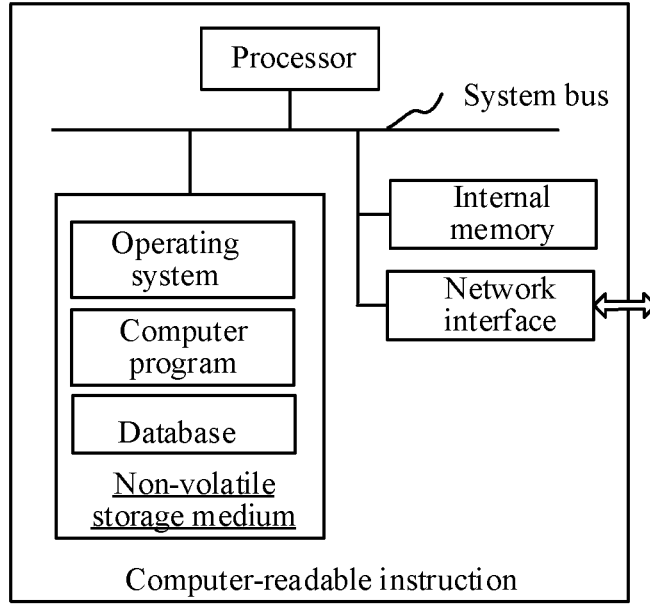
FIG. 10 is a diagram of an internal structure of a computer device according to some embodiments.
Figure 11:
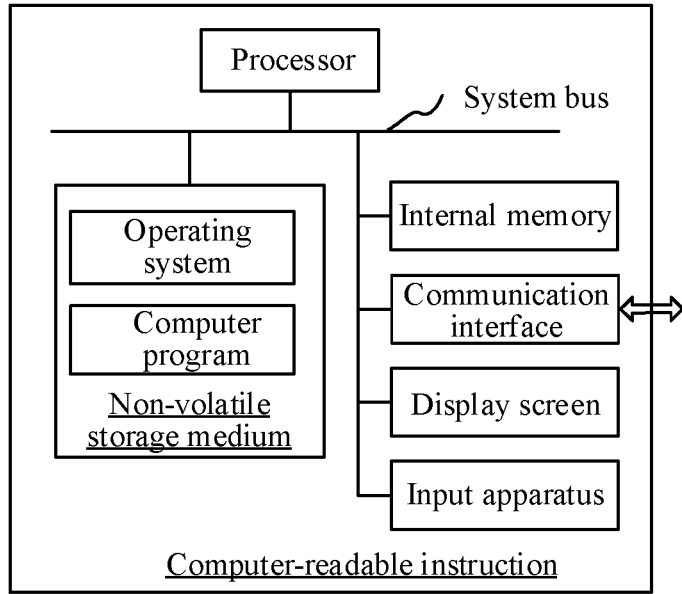
FIG. 11 is a diagram of an internal structure of a computer device according to some embodiments.

It is noted that FIG. 10 and FIG. 11 show block diagrams of some exemplary structures related to some examples of this disclosure, and does not limit the computer device to which this disclosure is applied. Specifically, the computer device may include more or fewer components than those shown in the figure, or some components may be combined, or different component deployment may be used.

It is noted that one or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, a computer device is further provided, including a memory and processing circuitry, such as one or more processors, the memory storing computer-readable instructions, the computer-readable instructions, when executed by the one or more processors, causing the one or more processors to implement the steps of the foregoing method embodiments.

In some embodiments, one or more computer-readable storage media (e.g., one or more non-transitory computer-readable storage mediums) are provided, storing computer-readable instructions, the computer-readable instructions, when executed by one or more processors, causing the one or more processors to implement the steps in the method embodiments.

A computer program product, including computer-readable instructions, the computer-readable instructions, when executed by a processor, implementing the steps in the image processing method.

It is noted that some or all procedures in the method in the foregoing embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache memory. As a description and not a limit, the RAM may be in a plurality of forms, such as a static random access memory (SRAM) or a dynamic random access memory (DRAM).

Technical features of the foregoing embodiments may be combined in various manners. To make the description more concise, not all possible combinations of the technical features in the foregoing embodiments are described. However, the combinations of these technical features shall be considered as falling within the scope recorded by this specification provided that no conflict exists.

The foregoing embodiments only describe several implementations of this disclosure, which are described specifically and in detail, but should be construed as a limitation to the scope of the present disclosure. It is noted that several transformations and improvements can be made without departing from the idea of this disclosure. These transformations and improvements belong to the scope of this disclosure.

What is claimed is:

1. A method for content recognition, comprising:

acquiring, from a content for recognition, a text piece and a media piece associated with the text piece, the media piece including image data or audio data of the content;

performing a first feature extraction on the text piece to obtain text features;

performing a second feature extraction on the media piece associated with the text piece to obtain media features;

determining feature association measures between the media features and the text features, a feature association measure for a first feature in the media features and a second feature in the text features indicating an association degree between the first feature and the second feature;

obtaining feature attention intensities corresponding to the text features based on the feature association measures, each value of the feature association measures being positively correlated with a respective value of the feature attention intensities, and the feature attention intensities including image attention intensities based on the image data or audio attention intensities based on the audio data;

adjusting the text features based on the feature association measures to obtain adjusted text features that include first adjusted text features obtained by adjusting the text features based on the image attention intensities or second adjusted text features obtained by adjusting the text features based on the audio attention intensities; and performing a recognition based on the adjusted text features to obtain a content recognition result of the content.

2. The method according to claim 1, wherein the performing the recognition comprises:

fusing the adjusted text features and the text features to obtain fused text features; and performing the recognition based on the fused text features to obtain the content recognition result of the content.

3. The method according to claim 2, wherein the fusing the adjusted text features and the text features comprises:

encoding the text features to obtain first encoded features;

encoding the adjusted text features to obtain second encoded features;

fusing the first encoded features and the second encoded features to obtain fused encoded features;

obtaining adjusted feature weights respectively associated with the adjusted text features based on the fused encoded features; and fusing the adjusted text features and the text features based on the adjusted feature weights to obtain the fused text features.

4. The method according to claim 3, wherein the first encoded features are obtained by encoding through a first encoder in a neural network with a trained content recognition model, the second encoded features are obtained by encoding through a second encoder in the neural network with the trained content recognition model, and the obtaining the adjusted feature weights respectively associated with the adjusted text features based on the fused encoded features comprises:

inputting the fused encoded features into an activation layer in the neural network that performs an activation processing to obtain activation values; and providing the activation values as the adjusted feature weights respectively associated with the adjusted text features, the activation layer being a shared activation layer of the first encoder and the second encoder.

5. The method according to claim 3, wherein the fusing the adjusted text features and the text features comprises:

obtaining text feature weights respectively associated with the text features based on the adjusted feature weights;

performing product operations on the adjusted text features with the adjusted feature weights that are respectively associated with the adjusted text features to weight the adjusted text features and obtain weighted adjusted text features;

performing product operations on the text features with the text feature weights that are respectively associated with the text features to weight the text features and obtain weighted text features; and

adding the weighted adjusted text features and the weighted text features to obtain the fused text features.

6. The method according to claim 1, wherein the content is a video, and the acquiring, from the content, the text piece and the media piece associated with the text piece comprises:

acquiring the text piece corresponding to a target time in the video; and acquiring the image data or the audio data corresponding to the target time in the video.

7. The method according to claim 6, wherein the image data corresponds to a video frame, the adjusted text features include the first adjusted text features obtained by a first adjustment according to the image attention intensities of the video frame, and the performing the recognition includes:

fusing the first adjusted text features and the text features to obtain fused text features; and performing the recognition based on the fused text features to obtain the content recognition result of the content.

8. The method according to claim 7, wherein the audio data corresponds to an audio frame, the adjusted text features include the second adjusted text features obtained by a second adjustment according to the audio attention intensities of the audio frame, and the performing the recognition includes:

fusing the first adjusted text features, the second adjusted text features, and the text features to obtain the fused text features; and performing the recognition based on the fused text features to obtain the content recognition result of the content.

9. The method according to claim 1, wherein the adjusting the text features comprises:

multiplying the feature attention intensities respectively with corresponding feature values of the text features to obtain feature value products;

arranging the feature value products into a sequence of the feature value products according to positions of the corresponding feature values in the text features; and providing the sequence of the feature value products as the adjusted text features.

10. The method according to claim 1, wherein the text features correspond to segmented words in the text piece, the adjusted text features form a feature sequence according to an order of the segmented words in the text piece, and the performing the recognition comprises:

obtaining, based on the feature sequence, corresponding positional relationships of the segmented words;

acquiring a named entity from the text piece based on the positional relationships; and providing the named entity as the content recognition result of the content.

11. The method according to claim 10, wherein the acquiring the named entity comprises:

acquiring a first segmented word, which has a first corresponding positional relationship indicative of a beginning position, to be a beginning word of the named entity;

extracting one or more second segmented words following the beginning word to be one or more constituent words, the one or more second segmented words having a second corresponding positional relationship indicative of inside positions; and combining the beginning word and the one or more constituent words to obtain the named entity.

12. The method according to claim 11, wherein the obtaining the corresponding positional relationships of the segmented words comprises:

obtaining, based on the feature sequence, the corresponding positional relationships of the segmented words and entity types respectively associated with the segmented words, and the extracting the one or more second segmented words comprises:

extracting the one or more second segmented words following the beginning word to be one or more constituent words, the one or more second segmented words having the second corresponding positional relationship indicative of the inside positions, and having a same entity type as the beginning word.

13. The method according to claim 1, wherein the determining the feature association measures between the media features and the text features comprises:

performing respective product operations on media feature values in the media features and text feature values in the text features at corresponding positions to obtain product operation values; and collecting statistics on the product operation values to obtain the feature association measures between the media features and the text features.

14. An apparatus for content recognition, comprising:
processing circuitry configured to:

acquire, from a content for recognition, a text piece and a media piece associated with the text piece, the media piece including image data or audio data of the content;

perform a first feature extraction on the text piece to obtain text features;

perform a second feature extraction on the media piece associated with the text piece to obtain media features;

determine feature association measures between the media features and the text features, a feature association measure for a first feature in the media features and a second feature in the text features indicating an association degree between the first feature and the second feature;

obtain feature attention intensities corresponding to the text features based on the feature association measures, each value of the feature association measures being positively correlated with a respective value of the feature attention intensities, and the feature attention intensities including image attention intensities based on the image data or audio attention intensities based on the audio data;

adjust the text features based on the feature association measures to obtain adjusted text features that include first adjusted text features obtained by adjusting the text features based on the image attention intensities or second adjusted text features obtained by adjusting the text features based on the audio attention intensities; and perform a recognition based on the adjusted text features to obtain a content recognition result of the content.

15. The apparatus according to claim 14, wherein the processing circuitry is configured to:

fuse the adjusted text features and the text features to obtain fused text features; and perform the recognition based on the fused text features to obtain the content recognition result of the content.

16. The apparatus according to claim 15, wherein the processing circuitry is configured to:

encode the text features to obtain first encoded features;

encode the adjusted text features to obtain second encoded features;

fuse the first encoded features and the second encoded features to obtain fused encoded features;

obtain adjusted feature weights respectively associated with the adjusted text features based on the fused encoded features; and fuse the adjusted text features and the text features based on the adjusted feature weights to obtain the fused text features.

17. The apparatus according to claim 16, wherein the first encoded features are obtained by encoding through a first encoder in a neural network with a trained content recognition model, the second encoded features are obtained by encoding through a second encoder in the neural network with the trained content recognition model, and the processing circuitry is configured to:

input the fused encoded features into an activation layer in the neural network for an activation processing to obtain activation values; and provide the activation values as the adjusted feature weights respectively associated with the adjusted text features, the activation layer being a shared activation layer of the first encoder and the second encoder.

18. The apparatus according to claim 16, wherein the processing circuitry is configured to:

obtain text feature weights respectively associated with the text features based on the adjusted feature weights;

perform product operations on the adjusted text features with the adjusted feature weights that are respectively associated with the adjusted text features to weight the adjusted text features and obtain weighted adjusted text features;

perform product operations on the text features with the text feature weights that are respectively associated with the text features to weight the text features and obtain weighted text features; and add the weighted adjusted text features and the weighted text features to obtain the fused text features.

19. A non-transitory computer-readable storage medium storing instructions which, when executed by at least one processor, cause the at least one processor to perform a method for content recognition comprising:

acquiring, from a content for recognition, a text piece and a media piece associated with the text piece, the media piece including image data or audio data of the content;

performing a first feature extraction on the text piece to obtain text features;

performing a second feature extraction on the media piece associated with the text piece to obtain media features;

determining feature association measures between the media features and the text features, a feature association measure for a first feature in the media features and a second feature in the text features indicating an association degree between the first feature and the second feature;

obtaining feature attention intensities corresponding to the text features based on the feature association measures, each value of the feature association measures being positively correlated with a respective value of the feature attention intensities, and the feature attention intensities including image attention intensities based on the image data or audio attention intensities based on the audio data;

adjusting the text features based on the feature association measures to obtain adjusted text features that include first adjusted text features obtained by adjusting the text features based on the image attention intensities or second adjusted text features obtained by adjusting the text features based on the audio attention intensities; and performing a recognition based on the adjusted text features to obtain a content recognition result of the content.

20. The apparatus according to claim 14, wherein the processing circuitry is configured to:

multiply the feature attention intensities respectively with corresponding feature values of the text features to obtain feature value products;

arrange the feature value products into a sequence of the feature value products according to positions of the corresponding feature values in the text features; and provide the sequence of the feature value products as the adjusted text features.

* * * * *